United States Patent [19]

Berneth et al.

[11] Patent Number: 5,017,707
[45] Date of Patent: May 21, 1991

[54] TETRAINDOLYLHEPTAMETHINE DYESTUFFS

[75] Inventors: Horst Berneth; Hubert Psaar, both of Leverkusen; Gert Jabs, Odenthal, all of Fed. Rep. of Germany

[73] Assignee: Bayer Aktiengesellschaft, Leverkusen, Fed. Rep. of Germany

[21] Appl. No.: 261,947

[22] Filed: Oct. 24, 1988

[30] Foreign Application Priority Data

Nov. 11, 1987 [DE] Fed. Rep. of Germany ....... 3738240

[51] Int. Cl.$^5$ .......................................... C07D 403/06
[52] U.S. Cl. .................................. 548/455; 546/201; 546/176; 546/273; 282/27 A; 438/411.1; 438/480; 438/537.1; 8/654; 427/144; 548/217; 548/159; 548/336; 430/495
[58] Field of Search ......................... 548/455; 546/201

[56] References Cited

U.S. PATENT DOCUMENTS 2,154,926  4/1939  Wolff et al. .......................... 548/455
2,158,287  5/1939  Konig et al. ......................... 548/455
3,957,288  5/1976  Lemahieu et al. .................... 548/455

Primary Examiner—David B. Springer
Attorney, Agent, or Firm—Sprung, Horn, Kramer & Woods

[57] ABSTRACT

Tetraindolylheptamethine ethers and alcohols of the isomeric formulae

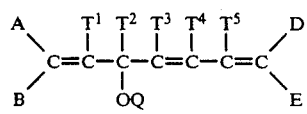

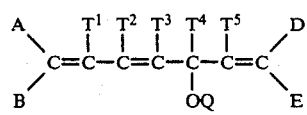

-continued

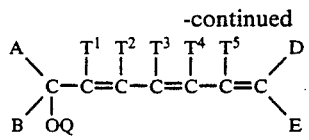

and

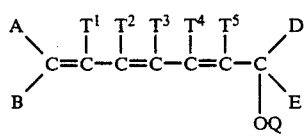

and dyestuffs of the formula

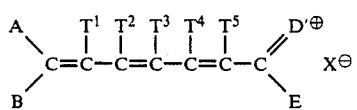

in which
A, B, D and E denote

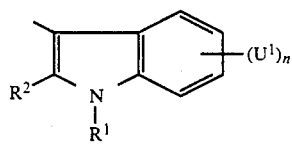

and
D'⊕ denotes

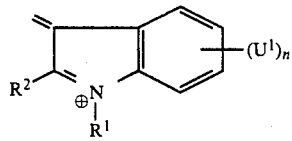

and the remaining symbols have the meanings given in the description, are used in pressure- and heat-sensitive recording materials.

5 Claims, No Drawings

TETRAINDOLYLHEPTAMETHINE DYESTUFFS

The invention relates to tetraindolylheptamethine ethers and alcohols of the isomeric formulae

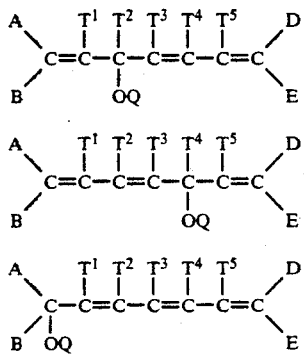

and

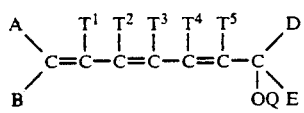

in which
A, B, D and E denote

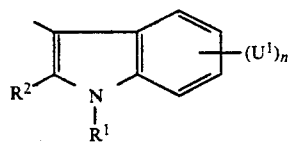

and can be identical to or different from one another,

Q denotes hydrogen, alkyl, alkenyl, cycloalkyl, aralkyl, aryl or a heterocyclic radical which is bound via an alkyl, $R^1$ denotes hydrogen, alkyl, alkenyl, cycloalkyl, aralkyl or a heterocyclic radical which is bound via an alkyl, $R^2$ denotes hydrogen, alkyl, alkenyl, cycloalkyl, aralkyl, aryl or a heterocyclic radical which is optionally bound via an alkyl, $T^1$ to $T^5$ denote hydrogen, alkyl, alkenyl, cycloalkyl, aralkyl, halogen, alkoxy, dialkylamino, cyano, hydroxycarbonyl, alkoxycarbonyl, aryl, a heterocyclic radical which is optionally bound via an alkyl, or two of the radicals $T^1$ to $T^5$ denote, in each case, the missing members of a five- to seven-membered ring, which can be aromatic or partially hydrogenated and can contain up to 2 heteroatoms from the series consisting of O, N or S, $U^1$ denotes hydrogen, alkyl, alkenyl, cycloalkyl, aralkyl, aryl, hydroxyl, alkoxy, halogen, dialkylamino, nitro, cyano, alkylthio, alkoxycarbonyl, dialkylaminocarbonyl, alkoxycarbonyloxy or alkylsulphonyl or together with $R^1$ denotes a $C_2$ or $C_3$ bridge and n denotes 1 or 2, and all cyclic and noncyclic radicals can carry nonionic substituents customary in dyestuff chemistry, to their preparation and use in pressure- and heat-sensitive recording materials which can be read in the infrared region from 750 to 950 nm, and also to recording materials containing these compounds.

Alkyl radicals, including those in, for example, alkoxy, alkylamino or aralkyl, can have up to 18 C atoms and can be substituted, for example by halogen, alkoxy, nitro, cyano, alkoxycarbonyl or alkylsulphonyl.

Alkenyl radicals can have up to 18 C atoms and can be substituted, for example by halogen, alkoxy, cyano or alkoxycarbonyl.

Cycloalkyl radicals can have 3 to 8 C atoms and can be substituted, for example, by alkyl, alkoxy, halogen, cyano, alkoxycarbonyl or aryl.

Aryl radicals, including those in aralkyl groups, are phenyl, naphthyl or anthracenyl, which can be substituted, for example by alkyl, alkoxy, halogen, cyano, alkoxycarbonyl, nitro, aryl or heterocyclic radicals, up to 5 substituents, which do not have to be identical, being possible.

Heterocyclic radicals, including those which are bound via an alkyl, are 5- to 7-membered aromatic or quasiaromatic heterocycles or their partially or completely hydrogenated derivatives containing O, N, S or $SO_2$ as heteroatoms, a maximum of 4 of these heteroatoms, which can also be mixed with respect to one another, being present in a ring and it being possible for these heterocycles to be fused with benzene, naphthalene or pyridine and/or substituted by alkyl, alkoxy, halogen, cyano, alkoxycarbonyl, nitro or aryl.

Preference is given to tetraindolylheptamethine ethers or alcohols of the isomeric formulae

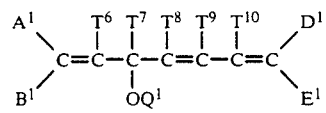

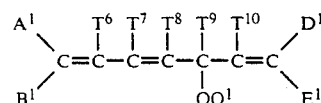

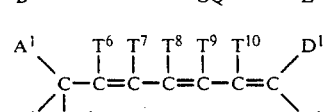

and

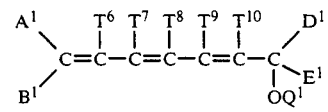

in which
$A^1$, $B^1$, $D^1$ and $E^1$ denote

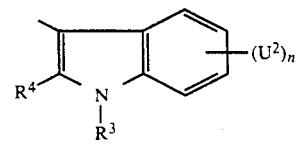

and can be identical to or different from one another, $Q^1$ denotes hydrogen, $C_1$ to $C_{18}$ alkyl which can be substituted by chlorine, $C_1$ to $C_4$ alkoxy, cyano or $C_1$ to $C_4$ alkoxycarbonyl, or allyl, cyclopentyl, cyclohexyl, or benzyl, phenethyl, naphthylmethyl, picolyl, phenyl or naphthyl radicals which are optionally substituted by $C_1$ to $C_4$ alkyl, chlorine and/or $C_1$ to $C_4$ alkoxy, $R^3$ denotes hydrogen, $C_1$ to $C_{18}$ alkyl which can be substituted by chlorine, $C_1$ to $C_4$ alkoxy, cyano or $C_1$ to $C_4$ alkoxycarbonyl, or allyl, cyclopentyl, cyclohexyl, or benzyl, phenethyl, naphthylmethyl or picolyl radicals which are optionally substituted by $C_1$ to $C_4$ alkyl, chlorine and/or $C_1$ to $C_4$ alkoxy, $R^4$ denotes hydrogen, $C_1$ to $C_{18}$ alkyl which can be substituted by chlorine, $C_1$ to $C_4$ alkoxy, cyano or $C_1$ to $C_4$ alkoxycarbonyl, or allyl, cyclopentyl, cyclohexyl, or benzyl, phenethyl, naphthylmethyl, picolyl, quinolylmethyl, phenyl, naphthyl, pyridyl, pyrimidyl, pyrazinyl, imidazolyl, oxazolyl, thiazolyl, triazolyl, benzimidazolyl, benzoxazolyl, benzothiazolyl or quinolyl radicals which are optionally substituted by $C_1$ to $C_4$ alkyl, chlorine, bromine, $C_1$ to $C_4$ alkoxy, cyano, nitro and/or $C_1$ to $C_4$ alkoxycarbonyl, $T^6$ to $T^{10}$ denote hydrogen, $C_1$ to $C_8$ alkyl which can be substituted by chlorine, $C_1$ to $C_4$ alkoxy, cyano or $C_1$ to $C_4$ alkoxycarbonyl, or vinyl, allyl, cyclohexyl, cyclopentyl, fluorine, chlorine, bromine, $C_1$ to $C_8$ alkoxy which can additionally be substituted by $C_1$ to $C_4$ alkoxy, or $C_1$ to $C_4$ dialkylamino, piperidino, pyrrolidino, nitro, cyano, $C_1$ to $C_4$ alkoxycarbonyl, or benzyl, phenethyl, naphthylmethyl, picolyl, phenyl, naphthyl, pyridyl, quinolyl, pyrimidyl, pyrazinyl, indolyl, indolenyl, indolizinyl, imidazolyl, oxazolyl, thiazolyl, triazolyl, benzimidazolyl, benzoxazolyl or benzothiazolyl radicals which are optionally substituted by $C_1$ to $C_4$ alkyl, chlorine, $C_1$ to $C_4$ alkoxy, $C_1$ to $C_4$ alkylsulphonyl, cyano and/or $C_1$ to $C_4$ alkoxycarbonyl, or two of the radicals $T^6$ to $T^{10}$ denote, in each case, a bridge of the formulae

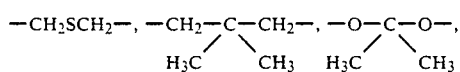

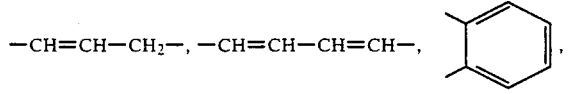

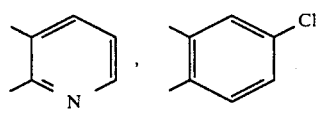

$U^2$ denotes hydrogen, $C_1$ to $C_8$ alkyl, allyl, cyclohexyl, benzyl, phenyl, hydroxyl, $C_1$ to $C_4$ alkoxy, chlorine, bromine, $C_1$ to $C_4$ dialkylamino, nitro, cyano, $C_1$ to $C_4$ alkylthio, $C_1$ to $C_4$ alkoxycarbonyl, $C_1$ to $C_4$ dialkylaminocarbonyl, $C_1$ to $C_4$ alkoxycarbonyloxy or $C_1$ to $C_4$ alkylsulphonyl or together with $R^3$ denotes a $-CH_2CH_2-$ or $-CH_2CH_2CH_2-$ bridge, which can be substituted by a maximum of 3 methyl groups, and n denotes 1 or 2.

Particular preference is given to tetraindolylheptamethine ethers or alcohols of the formulae V to VIII, in which $Q^1$ denotes hydrogen, $C_1$ to $C_8$ alkyl which can be substituted by chlorine methoxy, ethoxy or cyano, or allyl, cyclopentyl, cyclohexyl, or benzyl, phenethyl or picolyl radicals which are optionally substituted by methyl, chlorine or methoxy, $R^3$ denotes hydrogen, $C_1$ to $C_8$ alkyl which can be substituted by chlorine, methoxy, ethoxy, cyano or methoxycarbonyl, or allyl, cyclopentyl, cyclohexyl, or benzyl, phenethyl or picolyl radicals which are optionally substituted by methyl, chlorine or methoxy, $R^4$ denotes hydrogen, $C_1$ to $C_8$ alkyl which can be substituted by chlorine, methoxy, ethoxy, cyano or methoxycarbonyl, or allyl, cyclopentyl, cyclohexyl, or benzyl, phenethyl, picolyl, phenyl, naphthyl, pyridyl, pyrimidyl, benzimidazolyl, benzoxazolyl, benzothiazolyl or quinolyl radicals which are optionally substituted by methyl, chlorine, methoxy, cyano, nitro and/or methoxycarbonyl, $T^6$ and $T^{10}$ denote hydrogen, $C_1$ to $C_8$ alkyl which can be substituted by chlorine, methoxy, cyano or methoxycarbonyl, or vinyl, allyl, cyclopentyl, cyclohexyl, chlorine, $C_1$ to $C_8$ alkoxy, cyano, methoxycarbonyl, nitro, benzyl, or phenyl or pyridyl radicals which are optionally substituted by methyl, chlorine, cyano or methoxy, $T^7$ to $T^9$ denote hydrogen, $C_1$ to $C_8$ alkyl which can be substituted by chlorine, methoxy, cyano or methoxycarbonyl, or allyl, cyclopentyl, cyclohexyl, chlorine, bromine, cyano, methoxycarbonyl and ethoxycarbonyl, nitro, $C_1$ to $C_4$ alkoxy, $C_1$ to $C_4$ dialkylamino, benzyl, or phenyl, naphthyl, pyridyl, quinolyl, pyrimidyl, indolenyl, indolizinyl, imidazolyl, oxazolyl, thiazolyl, benzimidazolyl, benzoxazolyl or benzothiazolyl radicals which are optionally substituted by methyl, ethyl, chlorine, methoxy, ethoxy, cyano, nitro and/or methoxycarbonyl, or $T^7$ with or $T^8$ or $T^9$ or $T^8$ with $T^9$ denote a bridge of the formulae

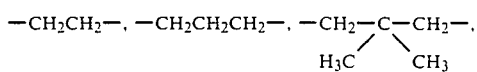

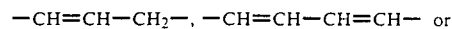

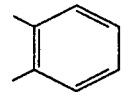

$U^2$ denotes hydrogen, $C_1$ to $C_4$ alkyl, cyclohexyl, benzyl, $C_1$ to $C_4$ alkoxy, chlorine, $C_1$ to $C_4$ dialkylamino, nitro, cyano, methoxycarbonyl or ethoxycarbonyl or methylsulphonyl, it being possible for $U^2$ to be in the 5-, 6- and/or 7-position on the indolyl radical or for a radical $U^2$ being in the 7-position to form, together with $R^3$, a bridge of the formulae

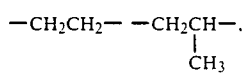

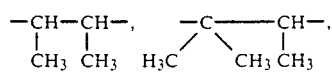

-continued

—CH₂CH₂CH₂—, —CH₂CH₂CH—, —C—CH₂—CH—
                    |            |        |
                    CH₃    H₃C  CH₃  CH₃ and n denotes 1 or 2.

Very particular preference is given to tetraindolyl-heptamethine ethers or alcohols of the formula (IX)

and to their isomeric forms with respect to the position of the Q²O group, such as are represented in the formulae II to IV and VI to VIII,
in which Q² denotes hydrogen, methyl, ethyl, propyl, butyl, hexyl, octyl, cyclohexyl or benzyl, R⁵ denotes methyl, ethyl, propyl, butyl, hexyl, octyl, 2-cyanoethyl, 2-methoxyethyl, 2-methoxycarbonylethyl, 2-chloroethyl, 2-acetoxyethyl, cyclohexyl, allyl or benzyl, R⁶ denotes methyl, ethyl, propyl, butyl, hexyl, octyl, cyclohexyl, benzyl, phenyl, 2-, 3- or 4-chlorophenyl, 2-, 3- or 4-methoxyphenyl, 4-nitrophenyl, 2,4-dichlorophenyl, 2-, 3- or 4-tolyl or 2-, 3- or 4-pyridyl, T¹¹ denotes hydrogen, methyl, ethyl, propyl, butyl, vinyl, 2-chloroethyl, 2-cyanoethyl, chlorine, cyano, phenyl, 4-tolyl or 4-chlorophenyl, T¹² and T¹³ denote hydrogen, methyl, ethyl, propyl, butyl, chlorine, cyano, methoxycarbonyl, dimethylamino, phenyl, 4-tolyl, 4-chlorophenyl, pyridyl or T¹² and T¹³ together denote a grouping of the formulae —CH₂CH₂—, —CH₂CH₂CH₂—, —CH₂—C—CH₂—,
                                    /    \
                                 H₃C    CH₃

[benzene ring structure]

T¹⁴ denotes hydrogen, methyl, ethyl, propyl, butyl, chlorine, bromine, cyano, phenyl, 4-tolyl, 4-chlorophenyl, 4-nitrophenyl, 4-pyridyl, 3,3-dimethylindolen-2-yl, indolizin-2-yl, 2-benzimidazolyl, 2-benzoxazolyl or 2-benzothiazolyl, U³ and U⁴ denote hydrogen, methyl, methoxy, chlorine, cyano, methoxycarbonyl or nitro.

The invention further relates to tetraindolylheptamethine dyestuffs of the formula $$A\underset{B}{\diagdown}C=C\underset{|}{\overset{T^1}{|}}-C\underset{|}{\overset{T^2}{|}}=C\underset{|}{\overset{T^3}{|}}-C\underset{|}{\overset{T^4}{|}}=C\underset{|}{\overset{T^5}{|}}-C\underset{E}{\diagup}\overset{D^\oplus}{\phantom{C}}\ X^\ominus$$    X in which A, B, E and T¹ to T⁵ have the meanings given for the formulae I to IV and D⊕ stands for

[indoline structure with R¹, R², (U¹)ₙ]

and

X⊖ stands for an anion, to their use in optical recording materials and also to optical recording materials containing these dyestuffs.

Anions X⊖ are, for example, halide ions, BF₄⊖, ClO₄⊖, SiF₆²⊖, B(C₆H₅)₄⊖ or the anions of C₁ to C₁₈ carboxylic acids, C₂-C₁₈ dicarboxylic acids, C₁ to C₁₈ alkanesulphonic acids, benzenemonocarboxylic, benzenedicarboxylic or benzenemonosulphonic or benzenedisulphonic, naphthalenemonocarboxylic, naphthalenedicarboxylic or naphthalenemonosulphonic or naphthalenedisulphonic acids which are optionally substituted by halogen, alkyl, alkoxy, cyano, alkoxycarbonyl, nitro or alkylsulphonyl.

The invention likewise relates to processes for the preparation of tetraindolylheptamethine ethers or alcohols of the formulae I to IV.

1. The preparation is carried out by condensation of ethylenes of the formulae $$A\underset{B}{\diagdown}C=CH-T^1 \quad \text{and/or} \quad T^5-CH=C\underset{E}{\diagup}D$$

XI    XII or carbinols of the formulae $$A\underset{B}{\diagdown}\underset{CH_2-T^1}{\overset{OH}{C}} \quad \text{and/or} \quad \underset{T^5-CH_2}{\overset{HO}{C}}\diagup E$$

XIII    XIV or salts of the formulae $$\underset{B}{\overset{A}{\diagdown}}\overset{\oplus}{C}-CH_2-T^1 \quad Y^{\ominus} \quad \text{and/or} \quad T^5-CH_2-\overset{\oplus}{\underset{E}{\overset{D}{\diagup}}}C \quad Y^{\ominus}$$
XV                XVI or other equivalents
with 1,3-dicarbonyl compounds of the formula $$\underset{O=C-CH-C=O}{\overset{T^2 \quad T^3 \quad T^4}{| \quad | \quad |}}$$ XVII or acetals or ketals thereof of the formula $$\underset{VO}{\overset{VO}{\diagdown}}\underset{C-CH-C}{\overset{T^2 \quad T^3 \quad T^4}{| \quad | \quad |}}\underset{OV}{\overset{OV}{\diagup}}$$ XVIII or vinylogous amidinium salts of the formula $$(V)_2N-\underset{}{\overset{T^2 \quad T^3 \quad T^4}{| \quad | \quad |}}\overset{\oplus}{C=C-C}=N(V)_2 \quad Y^{\ominus}$$ XIX or vinylogous chloroimmonium salts of formulae $$Cl-\underset{}{\overset{T^2 \quad T^3 \quad T^4}{| \quad | \quad |}}\overset{\oplus}{C=C-C}=N(V)_2 \quad Y^{\ominus}$$ XX or $$Cl-\underset{}{\overset{T^4 \quad T^3 \quad T^2}{| \quad | \quad |}}\overset{\oplus}{C=C-C}=N(V)_2 \quad Y^{\ominus}$$ XXI or other reactive equivalents of 1,3-dicarbonyl compounds and subsequent reaction with in which

MOQ          XXII in which

A, B, D, E, Q and $T^1$ to $T^5$ have the meanings given for the formulae I to IV and can be identical or different,
V stands for alkyl, aralkyl or aryl,
$Y^-$ stands for an anion,
M stands for an alkali metal ion, the equivalent of an alkaline earth metal ion or stands for $NR_4$ and R stands for alkyl, aralkyl or aryl.

Examples of M are lithium, sodium, potassium, ½ magnesium, ½ calcium, ½ barium, $N(C_2H_5)_4$,

[benzyl]—$CH_2N(CH_3)_3$.

The condensation is usually carried out in a solvent under acid and/or basic conditions, it being possible to add a water- or alcohol-removing agent, at temperatures between room temperature and the boiling point of the medium, preferably at 40° to 140° C.

Suitable solvents are alcohols such as methanol, ethanol, 1-propanol, 2-propanol, 1-butanol, 1-octanol, cyclohexanol, benzyl alcohol, it being preferable to use an alcohol of the formula

HOQ          XXIII in which

Q has the meaning given under the formulae I to IV.

Other suitable solvents are esters such as methyl, ethyl or butyl acetate; chlorinated hydrocarbons such as methylene chloride, ethylene chloride, chloroform; ketones such as acetone, 2-butanone; aromatics such as benzene, toluene, xylene; chlorinated aromatics such as chlorobenzene, dichlorobenzene; carboxylic acids such as formic acid, acetic acid, propionic acid, and anhydrides such as acetic anhydride.

Suitable acids are inorganic acids such as hydrochloric acid, sulphuric acid, tetrafluoroboric acid, perchloric acid, phosphoric acid; carboxylic acids such as formic acid, acetic acid, trifluoroacetic acid; sulphonic acids such as methanesulphonic acid, ethanesulphonic acid, trifluoromethanesulphonic acid, nonafluorobutanesulphonic acid, benzenesulphonic acid, toluenesulphonic acid, phosphonic acids such as methanephosphonic acid, or ion exchangers such as those based on sulphonated styrene/divinylbenzene polymers.

Suitable bases are amines such as triethylamine, triethanolamine, piperidine, pyrrolidine or pyridine.

Suitable water- or alcohol-removing agents are anhydrides such as acetic anhydride, trifluoroacetic anhydride, benzoic anhydride; acid chlorides such as acetyl chloride, phosphorus oxychloride, thionyl chloride, oxalyl chloride, phosgene, or inorganic oxides such as phosphorus pentoxide.

Examples of compounds of the formula XVII are:

$O=CH-CH_2-CHO$, [indane-1,3-dione], $O=CH-CH-CHO$ [with phenyl substituent], $O=CH-CH-CHO$ [with benzothiazole substituent], [5,5-dimethylcyclohexane-1,3-dione], $O=CH-CH-CHO$ with $CN$ Examples of compounds of the formula XVIII are:

$(CH_3O)_2CH-CH_2-CH(OCH_3)_2$   [1,1,3,3-tetramethoxycyclohexane with $CH_3O$, $CH_3O$, $OCH_3$, $OCH_3$]

Examples of compounds of the formula XIX are:

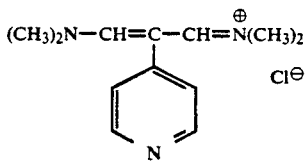

Examples of compounds of the formula XX are:

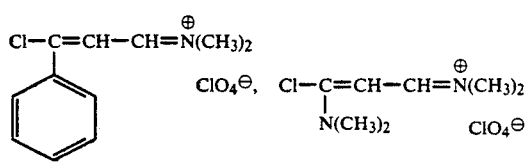

The dyestuffs of the formula X obtained by this condensation can be isolated.

However, to prepare the ethers and alcohols of the formulae I to IV, they are preferably further reacted, without isolation, with the hydroxides or alcoholates of the formula XXII. This is usually done in the condensation medium, it being possible to add water or alcohols of the formula XXIII. The temperatures are between room temperature and the boiling point of the medium, preferably between 20° and 140° C.

2. The preparation is carried out by condensation of aldehydes or ketones of the formulae

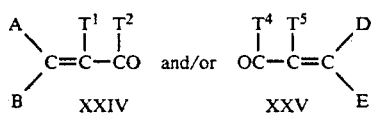

with butadienes of the formulae

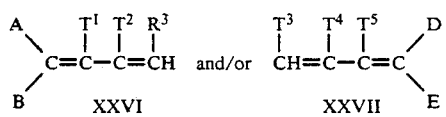

in which the symbols have the abovementioned meaning, followed by reaction with XXII.

The condensation is usually carried out under the conditions given above for process 1.

3. The preparation of compounds I to IV, where $T^3 = T^{3'}$, is carried out by condensation of aldehydes and ketones of the formulae XXIV and/or XXV with active methylene compounds of the formula $T^{3'}$—CH$_3$            XXVIII in which $T^{3'}$ denotes cyano, hydroxycarbonyl, alkoxycarbonyl, aryl or a heterocyclic radical, followed by reaction with XXII.

The condensation is usually carried out in the presence or absence of solvents under acid and/or basic conditions, it being customary to add a water-removing agent, at temperatures between room temperature and the boiling point of the medium, preferably at 25° to 150° C.

Suitable solvents are chlorinated hydrocarbons such as methylene chloride, ethylene chloride; aromatics such as benzene, toluene, xylene; chlorinated aromatics such as chlorobenzene, dichlorobenzene and carbon disulphide.

Suitable acids are inorganic acids such as sulphuric acid, tetrafluoroboric acid, perchloric acid; carboxylic acids such as formic acid, acetic acid, trifluoroacetic acid; sulphonic acids such as methanesulphonic acid, ethanesulphonic acid, trifluoromethanesulphonic acid, benzenesulphonic acid, toluenesulphonic acid.

Suitable bases are amines such as triethylamine, piperidine and quinoline.

Suitable dehydrating agents are anhydrides such as acetic anhydride; acid chlorides such as acetyl chloride, phosphorus oxychloride, phosphorus trichloride, thionyl chloride, oxalyl chloride, phosgene; inorganic oxides such as phosphorus pentoxide; or Lewis acids such as zinc chloride, iron chloride, aluminium chloride, boron trichloride, boron trifluoride, tin tetrachloride.

Examples of compounds of the formula XXVIII are:

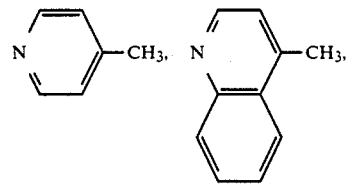

or equivalents of compounds of the formula XXVIII

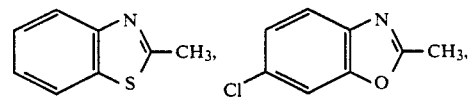

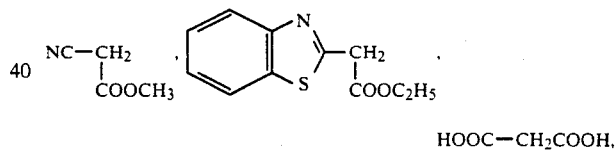

which after condensation give products which are similar to those of the corresponding compounds of the formula XXVIII.

The dyestuffs of the formula X obtained by the condensation can be isolated. However, they are preferably further reacted, without isolation, with the hydroxides or alcoholates of the formula XXII. This is done in the manner described above.

The invention relates also to mixtures of compounds I to IV. The substituents A, B, D, E and $T^1$ to $T^5$ can be identical to or different from one another. The mixtures can be obtained by mixing the components. Preference is given to mixtures which are obtained directly in processes 1 to 3. They may contain several isomers, depending on the substituents of the starting components and their mixes.

These mixtures are usually distinguished by a particularly high solubility in the solvents which are commonly used.

The tetraindolylheptamethine ethers or alcohols of the formulae I to IV and their mixtures are colourless to brownish solids.

Solutions in acetic acid show strong absorption with a maximum in the region from 750 to 950 nm. In addition, very weak absorption with a maximum in the region from 500 to 650 nm is found.

If a solution in toluene, which is colourless to beige, is brought into contact with acid clay or silica gel, a bluish to greenish grey colour develops spontaneously. In addition, in the near infrared region from 750 to 950 nm, a very strong absorption can be measured, for example using Dr. Lange colour measuring system Xenocolor LS 100.

If a sample of an ether or alcohol of the formulae I to IV is ground together with 2,2-bis(4-hydroxyphenyl)-propane, a colourless to beige powder is obtained. If this powder is heated, for example in a melting point tube, a strong black-blue colour develops above about 100° C.

Accordingly, the tetraindolylheptamethine ethers or alcohols of the formulae I to IV are highly suitable according to the invention for pressure- or heat-sensitive recording materials which can be read in the infrared region from 750 to 950 nm.

Recording materials which absorb in the near infrared are required for reading the recorded information using suitable instruments. The spread of computers and automatic data processing require instruments which are capable of reading the information contained in documents. Therefore, machines for optical character recognition (OCR) have been developed which are capable of reading pages of text which have been written in the character type programmed in each case. Such machines usually operate in the near infrared, and therefore the characters to be read must of course have absorptions in the near infrared. However, conventional pressure- and heatsensitive recording materials do not have such an absorption in the near infrared.

Recording materials which do have such an absorption in the near infrared are described, for example, in U.S. Pat. Nos. 4,020,056, 4,022,771, 4,026,883, 4,107,428 and 4,119,776 and in European Application 0,124,377.

The tetraindolylheptamethine ethers and alcohols according to the invention of the formulae I to IV and their mixtures have been found to be highly suitable for these OCR-readable recording materials. For this, in addition to their strong absorption in the region from 750 to 950 nm, especially the weak absorption in the visible spectral region is particularly advantageous because the compounds according to the invention can therefore be added in a simple manner to existing colour former mixtures, which develop, for example, blue or black colours in a known manner, without this colour being significantly affected by the developing colour of the compounds according to the invention.

Suitable colour formers which can be mixed with the tetraindolylheptamethine ethers or alcohols according to the invention of the formulae I to IV originate, for example, from the following classes of substances: phthalides, fluoranes, spirodipyrans, chromenoindoles, phenoxazines, phenothiazines, carbazolylmethanes, dihydroquinazolones, dihydro-3,1-benzoxazin-2-ones, 3,1-benzoxazines or other triarylmethane leuco dyestuffs.

The preparation of these pressure- or heatsensitive recording materials is carried out in a known manner.

A pressure-sensitive material consists, for example, of at least 1 pair of sheets containing at least one colour former of the formulae I to IV, dissolved or dispersed in a non-volatile organic solvent, and one acid developer.

Such processes and formulations are known, for example, from U.S. Pat. Nos. 2,800,457, 2,800,458, 2,948,753, 3,096,189 and 3,193,404 and from German Offenlegungsschriften 2,555,080 and 2,700,937.

To avoid a premature activation of the colour formers present in the pressure-sensitive recording material, these colour formers are preferably enclosed in microcapsules which can usually be broken by applying pressure.

Suitable capsule wall materials are, for example, gelatin/gum arabic, polyamides, polyurethanes, polysulphonamides, polyesters, polycarbonates, polysulphonates, polyacrylates and phenol/formaldehyde, melamine/ formaldehyde or urea/formaldehyde condensates, such as are described, for example, in M. Gutcho, Capsule Technology and Microencapsulation, Noyes Data Corporation 1972, G. Baster, Microencapsulation, Processes and Applications, editor J.E. Vandegaar and in German Offenlegungsschriften 2,237,545 and 2,119,933.

Preferably, those microcapsules are used whose casings consist of polyaddition products of polyisocyanates and polyamines.

Isocyanates, amines, solvents and a suitable process for preparing such microcapsules are described, for example, in German Offenlegungsschrift 3,203,059.

Likewise, those microcapsules are preferably used whose casings consist of polyamides or melamine/formaldehyde condensates or gelatin/gum arabic.

Suitable developers are clays, clays modified by acids, oxides or acid salts and also monomeric or polymeric phenols or carboxylic acids.

The tetraindolylheptamethine ethers and alcohols of the formulae I to IV are usually sufficiently to highly soluble in the non-volatile organic solvents customary for microencapsulation.

Thermoreactive recording systems comprise, for example, heat-sensitive recording and copying materials and papers.

Such a material is described, for example, in German Offenlegungsschrift 2,555,080.

Suitable developers are the same electron acceptors which are used in pressure-sensitive papers, preferably phenolic compounds, which are described, for example, in German Patent 1,251,348, and also boric acid and organic, preferably aliphatic dicarboxylic acids.

A further suitable thermoreactive developing system is described in German Offenlegungsschrift 3,337,296, in which acid-modified polymers, preferably of acrylonitrile, act as developers.

The tetraindolylheptamethine dyestuffs of the formula X are suitable for optical recording materials.

These optical recording materials comprise lightabsorbing coating on a substrate, in most cases a plastic sheet. This coating frequently also contains a binder in addition to the dyestuff. Advantageously, it is applied from a solution, for example by spin coating. This coating must be very thin, very even and of high optical quality. In addition, it must absorb strongly in the region of the light source. The light source used comprises lasers, preferably laser diodes which operate in the wavelength region from 700 to 1,400 nm.

The preparation of these coatings and their use for optical recording is described, for example, in WO 84/02795 and EP 0,023,736.

Because of their appreciable absorption in the range from 750 to 950 nm, the tetraindolylheptamethine dyestuffs of the formula X are especially highly suitable for use in optical recording materials. Mixtures are likewise suitable. They are readily soluble in the solvents customary for coating. These solvents are, for example, chlorinated hydrocarbons, for example methylene chloride, 1,2-dichloroethane; ketones, for example 2-butanone, cyclohexanone; aromatics, for example xylene; esters, for example ethyl or butyl acetate; alcohols, for example methanol, ethanol or butanol or mixtures thereof. Preference is given to alcohols because they do not attack the plastic sheet.

Suitable binders are all film-forming materials, preferably polymers, for example polystyrene, poly-α-methylstyrene, polymethyl methacrylate, polyvinyl chloride, polyvinyl acetate, polyvinyl acetate/vinylpyrrolidone, polycarbonate, cellulose nitrate, cellulose acetate/butyrate or mixtures or copolymers thereof.

black-blue solution containing the dyestuff of the formula

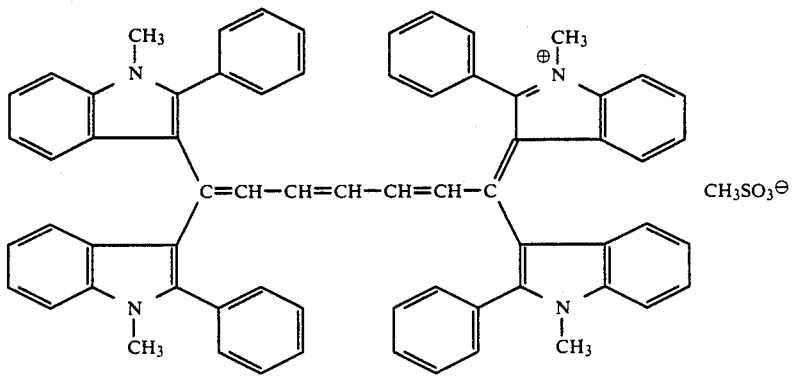

is poured into 200 ml of methanol and made alkaline with 50 ml of 30% strength methanolic sodium methylate solution. The beige-brown product is filtered off with suction, washed with methanol and water, and dried:

22.0 g (94.6% of theory). The product is boiled in 200 ml of methanol for 2 hours, cooled, filtered off with suction and dried:

18.5 g (79.6%) of brownish-beige powder of melting point 216°–218° C.

The product in one isomeric form corresponds to the formula:

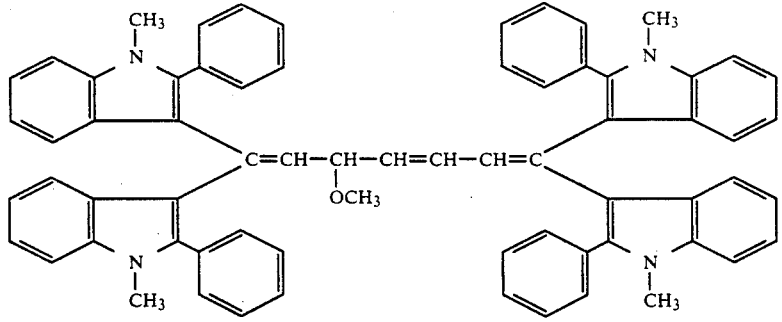

EXAMPLE 1

21.9 g of 1,1-bis(1-methyl-2-phenylindol-3-yl)ethylene and 4.3 g of 1,1,3,3-tetramethoxypropane are stirred in a mixture of 50 ml of acetic anhydride and 2.5 g of methanesulphonic acid at 80° C. for 1 hour. The A solution in glacial acetic acid has a dirty blue colour and $\lambda_{max}$ of 863 nm. A solution in toluene in contact with acid clay develops a pale grey-blue colour.

In the infrared, an absorption extending from 750 to 950 nm is measured.

The following examples can be prepared analogously

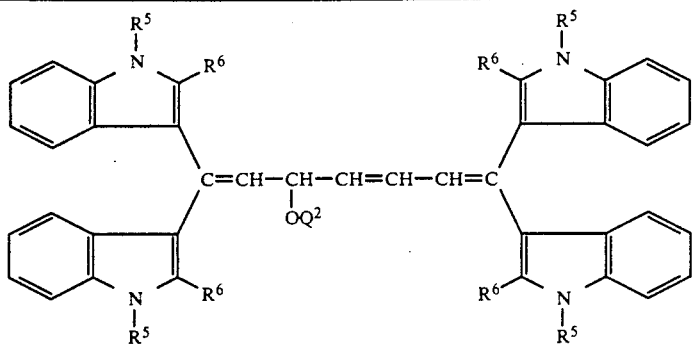
| Example | R⁵ | R⁶ | Q² | $\lambda_{max}$ in glacial acetic acid |
|---|---|---|---|---|
| 2 | —C₂H₅ | —C₆H₅ | —CH₃ | 864 nm |
| 3 | n-C₄H₉ | —C₆H₅ | —CH₃ | 867 nm |
| 4 | n-C₈H₁₇ | —C₆H₅ | —CH₃ | 867 nm |
| 5 | —CH₂—C₆H₅ | —C₆H₅ | —CH₃ | 874 nm |
| 6 | —CH₃ | —C₆H₄—OCH₃ (p) | —CH₃ | 870 nm |
| 7 | —CH₃ | —C₆H₄—Cl (p) | —CH₃ | 865 nm |
| 8 | —CH₃ | —C₆H₅ | —C₂H₅ | 862 nm |
| 9 | —CH₃ | —C₆H₄—Cl (o) | —C(CH₃)₃ | 859 nm |
| 10 | —CH(CH₃)₂ | —C₆H₄—CH₃ (p) | n-C₄H₉ | 867 nm |
| 11 | —CH₃ | —C₆H₅ | —CH₂—C₆H₅ | 863 nm |
| 12 | —CH₃ | —CH₃ | —CH₃ | 818 nm |

-continued

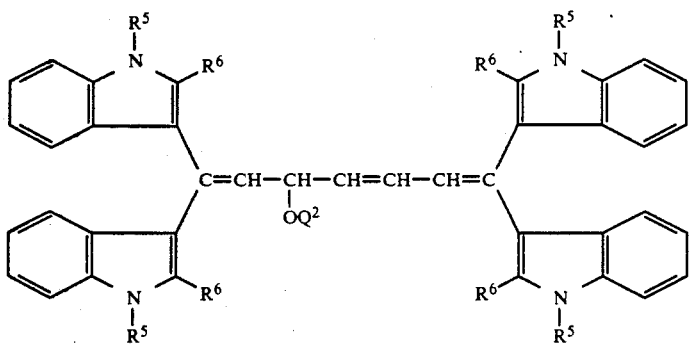

| Example | $R^5$ | $R^6$ | $Q^2$ | $\lambda_{max}$ in glacial acetic acid |
|---|---|---|---|---|
| 13 | —CH$_2$—C$_6$H$_5$ | —CH$_3$ | —CH$_3$ | 824 nm |
| 14 | —CH$_3$ | n-C$_4$H$_9$ | —CH$_3$ | 820 nm |
| 15 | —CH$_3$ | n-C$_8$C$_{17}$ | —CH$_3$ | 820 nm |
| 16 | —CH$_2$CH$_2$CN | —C$_6$H$_5$ | —CH$_3$ | 852 nm |
| 17 | —CH$_2$CH$_2$OCH$_3$ | n-C$_6$H$_{13}$ | —C$_2$H$_5$ | 825 nm |

EXAMPLE 18

21.9 g of 1,1-bis(1-methyl-2-phenylindol-3-yl)ethylene and 4.3 g of 1,1,3,3-tetramethoxypropane are boiled in a mixture of 100 ml of butanol and 5 g of concentrated hydrochloric acid for 1 hour.

This gives a solution of the dyestuff of the formula

To isolate the ether, the solution is cooled and 38 ml of a 2 molar butanolic potassium butylate solution are added dropwise. The product is filtered off with suction, washed with butanol and hexane and dried. The brownish product is extracted in a hot extractor with methylcyclohexane, the first portions being discarded. In this manner, 10.5 g (42.6%) of a pale beige powder of

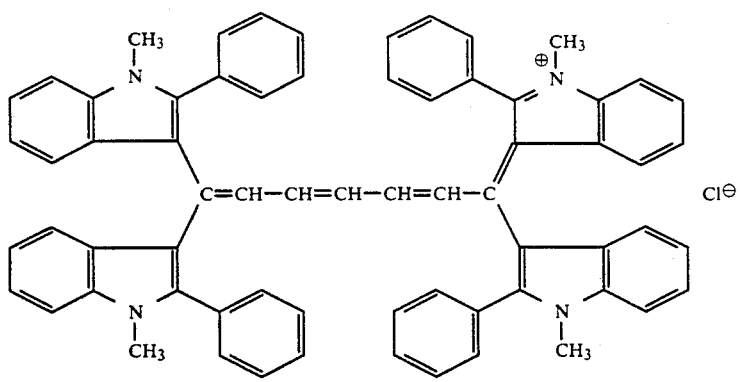

which can be used for the preparation of optical recording materials. The dyestuff can be isolated by evaporation of the solvent.

melting point 202° to 205° C. are obtained. In one isomeric form it corresponds to the formula

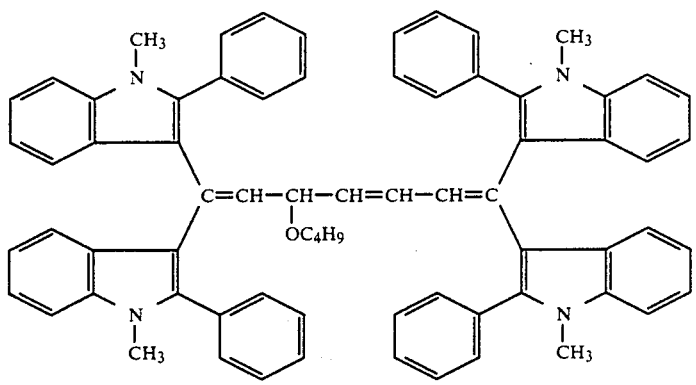

λ$_{max}$ in glacial acetic acid: 860 nm. In contact with acid clay: grey-blue, 750 to 950 nm.

The following examples can be prepared analogously:

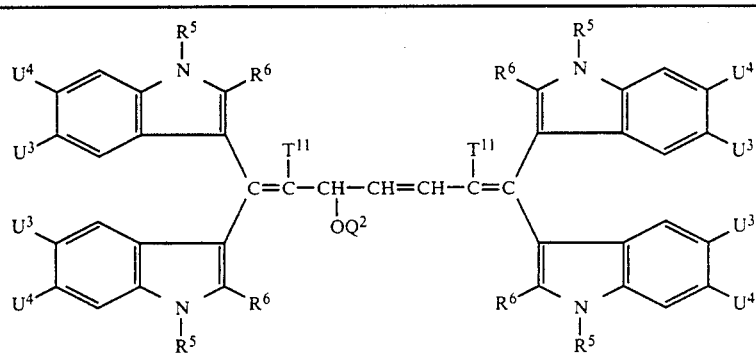

| Example | R$^5$ | R$^6$ | Q$^2$ | U$^3$ | U$^4$ | T$^{11}$ | λ$_{max}$ in glacial acetic acid |
|---|---|---|---|---|---|---|---|
| 19 | —CH$_3$ | 4-pyridyl | —C$_2$H$_5$ | H | H | H | 857 nm |
| 20 | —CH$_2$—CH=CH$_2$ | 4-methoxyphenyl | n-C$_4$H$_9$ | H | H | CH$_3$ | 872 nm |
| 21 | —CH$_3$ | phenyl | n-C$_8$H$_{17}$ | H | Cl | H | 865 nm |
| 22 | —CH$_3$ | phenyl | —CH$_2$-phenyl | —OCH$_3$ | H | H | 870 nm |
| 23 | —CH$_3$ | phenyl | cyclohexyl | —CH$_3$ | —CH$_3$ | H | 865 nm |
| 24 | —C$_2$H$_5$ | phenyl | CH$_3$ | —CH$_3$ | H | H | 864 nm |

-continued

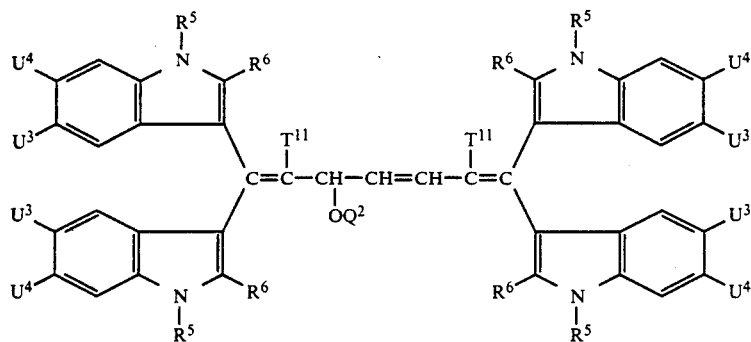

| Example | R⁵ | R⁶ | Q² | U³ | U⁴ | T¹¹ | $\lambda_{max}$ in glacial acetic acid |
|---|---|---|---|---|---|---|---|
| 25 | $CH_3$ | phenyl | $CH_3$ | H | H | $CH_3$ | 862 nm |
| 26 | $CH_3$ | phenyl | $CH_3$ | H | H | $-CH_2CH_2Cl$ | 867 nm |
| 27 | $CH_3$ | 4-Cl-phenyl | $C_2H_5$ | Cl | H | $-C_2H_5$ | 863 nm |
| 28 | $CH_3$ | $CH_3$ | $-CH(CH_3)_2$ | H | H | phenyl | 800 nm |
| 29 | H | $CH_3$ | $CH_3$ | H | H | CN | 791 nm |
| 30 | $CH_3$ | phenyl | $CH_3$ | H | H | Cl | 900 nm |
| 31 | $CH_3$ | H | $n\text{-}C_3H_7$ | H | H | $-CH_2CH_2CN$ | 815 nm |
| 32 | $-CH_2$-(4-pyridyl) | phenyl | $CH_3$ | H | H | H | 870 nm |
| 33 | $CH_3$ | phenyl | $C_2H_5$ | $NO_2$ | H | H | 858 nm |
| 34 | $-CH_2$-phenyl | $CH_3$ | $-C(CH_3)_3$ | H | CN | H | 830 nm |

EXAMPLE 35

21.9 g of 1,1-bis(1-methyl-2-phenylindol-3-yl) ethylene and 7.35 g of dimethyl-(3-chloro-3-phenylprop-2-en-1-ylidene)ammonium perchlorate are boiled in 50 ml of acetic anhydride for 1.5 hours. The mixture is cooled and poured into 250 ml of methanol, precipitating the dyestuff of the formula

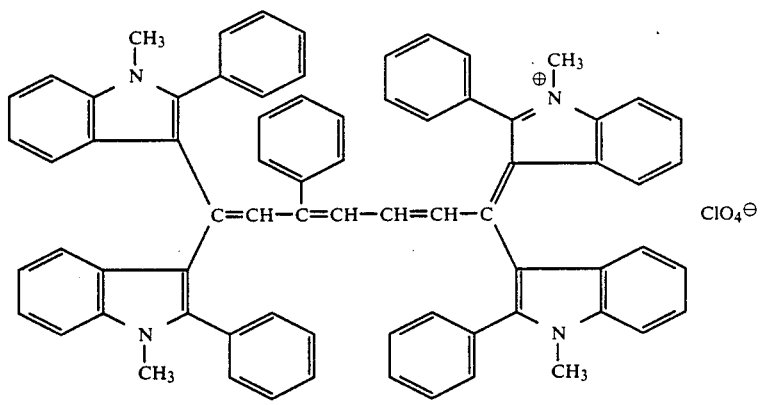

as a black powder. This suspension is then made alkaline with methanolic sodium methylate solution. The dark brown powder is filtered off with suction, washed with water and dried. It is dissolved in acetonitrile with heating, filtered, cooled and filtered off with suction: 3.0 g (11.8%) of a brown powder. In one isomeric form it corresponds to the formula

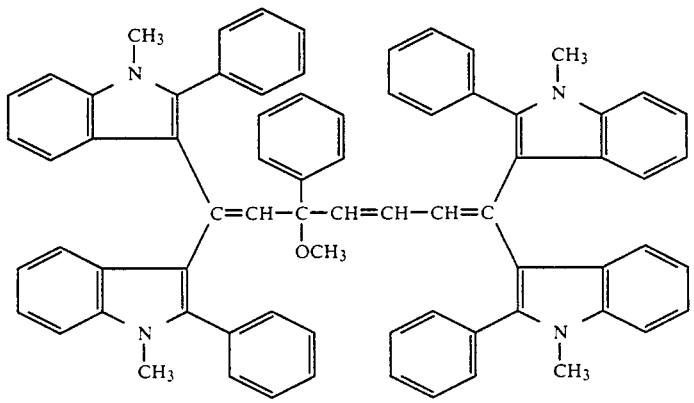

$\lambda_{max}$ in glacial acetic acid: 897 nm.

The following examples can be prepared analogously:

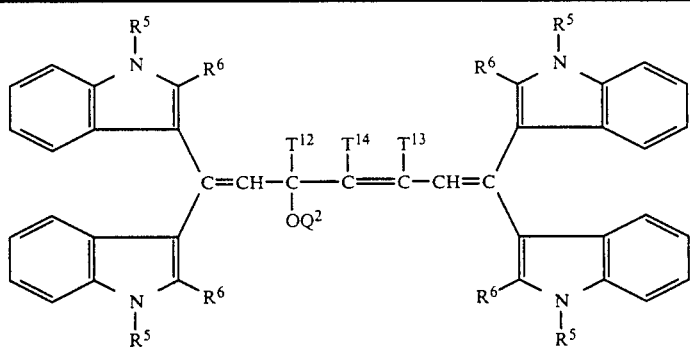

| Example | R⁵ | R⁶ | Q² | T¹² | T¹³ | T¹⁴ | λmax in glacial acetic acid |
|---|---|---|---|---|---|---|---|
| 36 | —CH₃ | —C₆H₅ | —CH₂—C(CH₃)₃ | —C₆H₄—CH₃ | H | H | 895 nm |
| 37 | —CH₃ | —C₆H₅ | —C₂H₅ | —C₆H₄—OCH₃ | H | H | 885 nm |

-continued

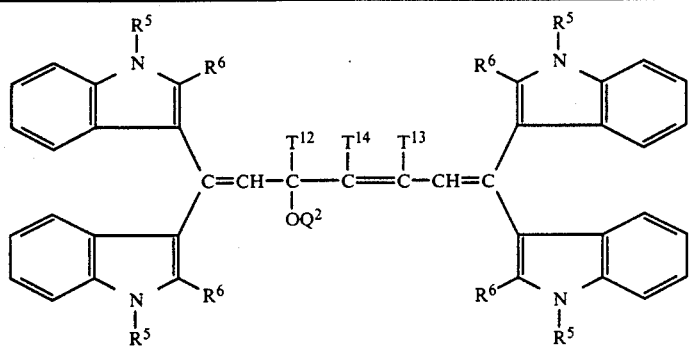

| Example | $R^5$ | $R^6$ | $Q^2$ | $T^{12}$ | $T^{13}$ | $T^{14}$ | λmax in glacial acetic acid |
|---|---|---|---|---|---|---|---|
| 38 | —CH$_3$ | phenyl | —CH$_3$ | 4-pyridyl | H | H | 905 nm |
| 39 | —CH$_3$ | 3-methylphenyl | —CH$_3$ | phenyl | Cl | H | 900 nm |
| 40 | —C$_2$H$_5$ | phenyl | —CH$_3$ | —N(CH$_3$)$_2$ | H | H | 770 nm |
| 41 | —CH$_3$ | phenyl | —CH$_3$ | —N(pyrrolidinyl) | H | phenyl | 802 nm |
| 42 | n-C$_4$H$_9$ | 4-methoxyphenyl | CH$_3$ | —N(pyrrolidinyl) | —(CH$_2$)$_3$— | | 765 nm |

EXAMPLE 43

21.9 g of 1,1-bis(1-methyl-2-phenylindol-3-yl) ethylene and 8.1 g of dimethyl-(3-dimethylamino-2-(4-pyridyl)-2-propen-1-ylidene)ammonium chloride are boiled in a mixture of 50 ml of acetic anhydride and 2.9 g of methanesulphonic acid for 37 hours. After cooling, the mixture is poured into 250 ml of methanol to give a blue solution containing the dyestuff of the formula 125 ml of 30% strength methanolic sodium methylate solution are added to this solution to give 20.0 g (78.3%) of a brownish powder. In one isomeric form it corresponds to the formula

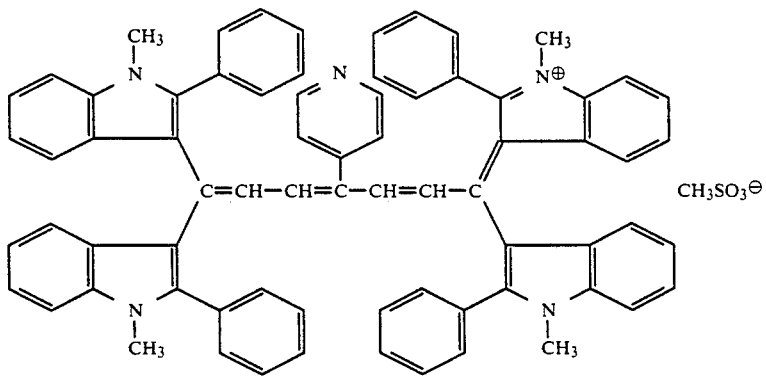

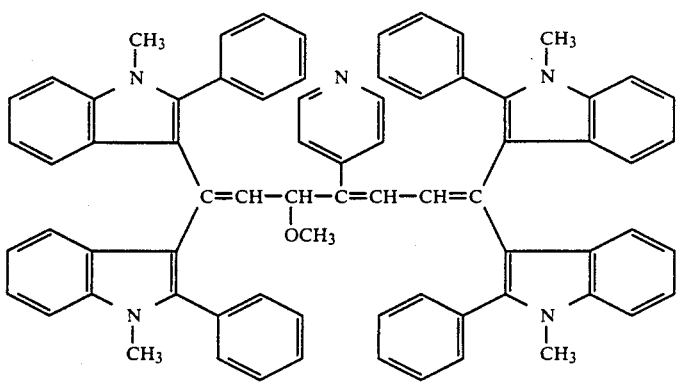

$\lambda_{max}$ in glacial acetic acid: 850 nm.

The following examples can be prepared analogously:

1-olate are stirred in a mixture of 50 ml of acetic anhydride and 7.7 g of trifluoromethanesulphonic acid at 90° C. for 1 hour. After cooling, the greenish blue solution

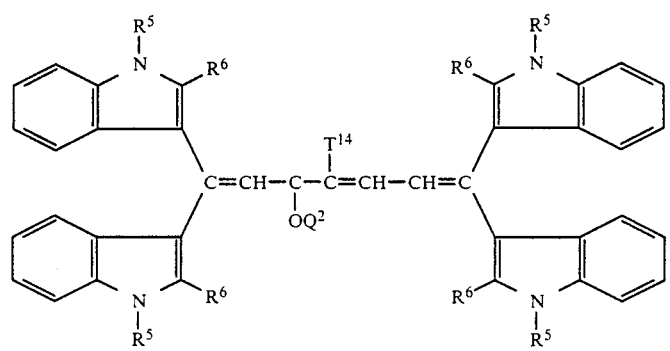

| Example | $R^5$ | $R^6$ | $Q^2$ | $T^{14}$ | $\lambda$max in glacial acetic acid |
|---------|-------|-------|-------|----------|-------------------------------------|
| 44 | —CH$_3$ | phenyl | n-C$_4$H$_9$ | quinolin-4-yl | 856 nm |
| 45 | —C$_2$H$_5$ | 4-methylphenyl | —CH$_3$ | 5-tert-butyl-benzoxazol-2-yl | 860 nm |
| 46 | —CH$_2$-phenyl | —C$_2$H$_5$ | —CH$_3$ | —CN | 800 nm |

EXAMPLE 47

21.9 g of 1,1-bis(1-methyl-2-phenylindol-3-yl) ethylene and sodium 2-(benzothiazol-2-yl)-3-oxo-prop-1-encontaining the dyestuff of the formula

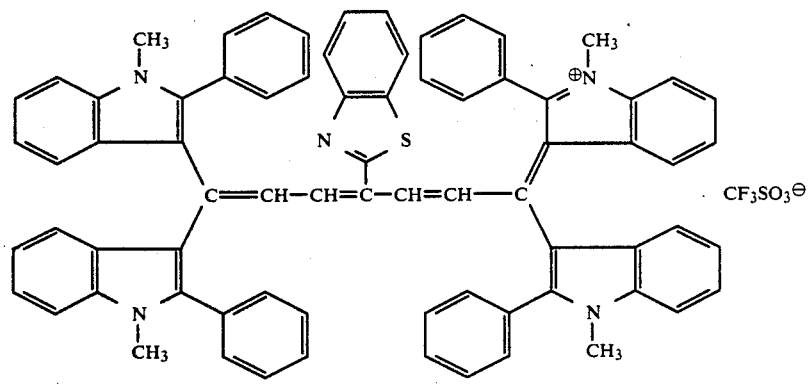

is poured into 250 ml of methanol and made alkaline with methanolic methylate solution. The product is filtered off with suction and washed with methanol and water. Upon recrystallization from butanol, 22.3 g (82.8%) of a yellow powder of melting point 217° to 219° C. are obtained. The product one isomeric form corresponds to the formula

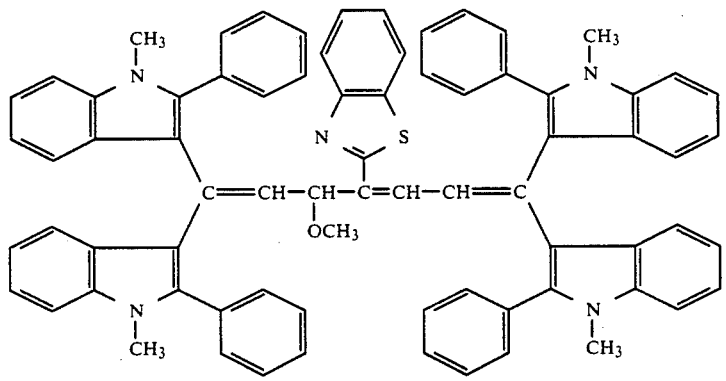

$\lambda_{max}$ in glacial acetic acid: 859 nm. In contact with acid clay: greenish grey, 750 to 950 nm.

The following examples can be prepared analogously:

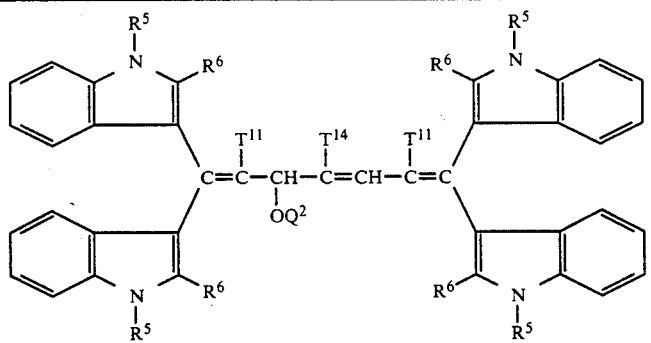

| Example | $R^5$ | $R^6$ | $Q^2$ | $T^{11}$ | $T^{14}$ | $\lambda$max in glacial acetic acid |
|---|---|---|---|---|---|---|
| 48 | —CH$_2$—C$_6$H$_5$ | —CH$_3$ | —CH$_3$ | —CH$_3$ | benzoxazol-2-yl | 815 nm |
| 49 | —CH$_3$ | —C$_6$H$_5$ | —CH$_2$—C$_6$H$_5$ | H | 1-methylbenzimidazol-2-yl | 858 nm |

-continued

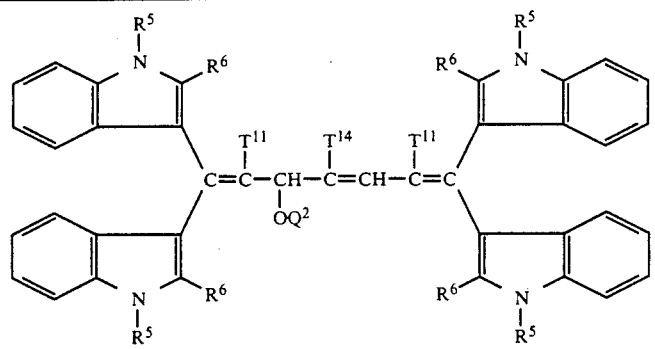

| Example | R[5] | R[6] | Q[2] | T[11] | T[14] | λmax in glacial acetic acid |
|---|---|---|---|---|---|---|
| 50 | —CH$_3$ | phenyl | —CH(CH$_3$)$_2$ | H | —CN | 800 nm |
| 51 | —CH$_3$ | phenyl | cyclohexyl | H | 5-chlorobenzoxazol-2-yl | 859 nm |
| 52 | —C$_2$H$_5$ | 3-methylphenyl | —CH$_3$ | H | pyridin-4-yl | 851 nm |
| 53 | —CH$_3$ | phenyl | n-C$_4$H$_9$ | —CH$_3$ | benzothiazol-2-yl | 859 nm |
| 54 | —CH$_3$ | phenyl | —CH$_3$ | H | 3,3-dimethyl-3H-indol-2-yl | 857 nm |
| 55 | —CH$_3$ | phenyl | —CH$_3$ | H | benzoxazol-2-yl | 858 nm |
| 56 | —CH(CH$_3$)$_2$ | phenyl | —C$_2$H$_5$ | H | 6-nitrobenzothiazol-2-yl | 859 nm |
| 57 | —CH$_3$ | 4-ethoxyphenyl | —CH$_3$ | H | —CH$_3$ | 857 nm |
| 58 | —CH$_3$ | phenyl | —CH$_3$ | H | —Br | 869 nm |

EXAMPLE 59

21.9 g of 1,1-bis(1-methyl-2-phenylindol-3-yl) ethylene and 4.4 g of 2,3-dichloromalealdehydic acid are boiled in a mixture of 50 ml of glacial acetic acid, 5.2 g of acetic anhydride and 0.9 g of piperidine for 4 hours. After cooling, the blue solution containing the dyestuff of the formula

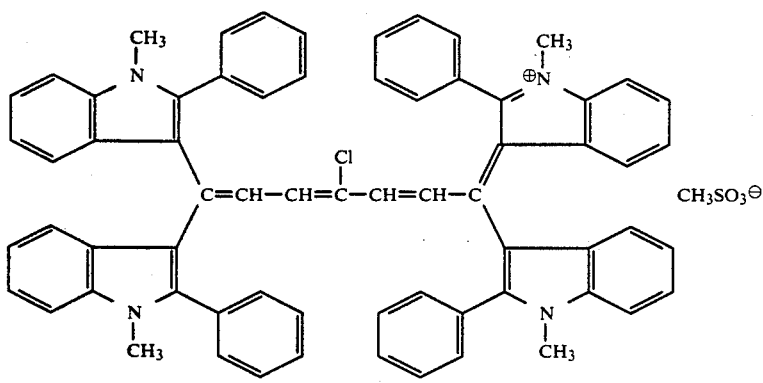

is poured into 200 ml of methanol and made alkaline with methanolic sodium methylate solution. The product is filtered off with suction, washed with methanol and water and dried. This gives 19.5 g (79.7%) of a brownish powder. In one isomeric form it corresponds to the formula boiled in a mixture of 50 ml of acetic anhydride and 2.5 g of methane sulphonic acid for 1 hour. After cooling, the blue solution containing the dyestuff of the formula

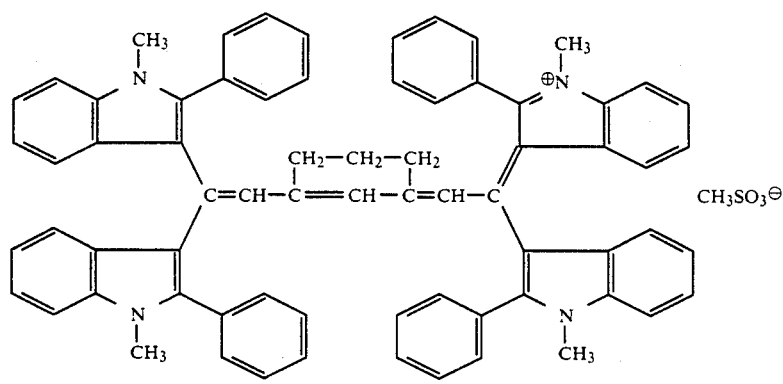

is poured into 200 ml of methanol and made alkaline with ethanolic sodium methylate solution. The product is filtered off with suction, washed with ethanol and water and dried. This gives 17.3 g (69.5%) of a brownish ochre powder. In one isomeric form it corresponds to the formula:

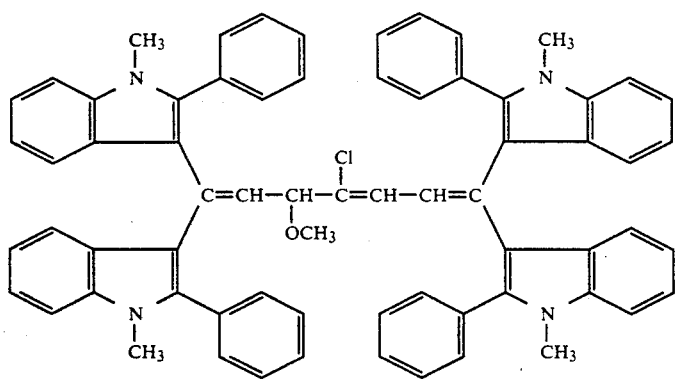

$\lambda_{max}$ in glacial acetic acid: 874 nm.
In contact with acid clay: greenish grey, 750 to 950 nm.

EXAMPLE 90

21.9 g of 1,1-bis(1-methyl-2-phenylindol-3-yl) ethylene and 7.39 g of 1,1,3,3-tetramethoxycyclohexane are

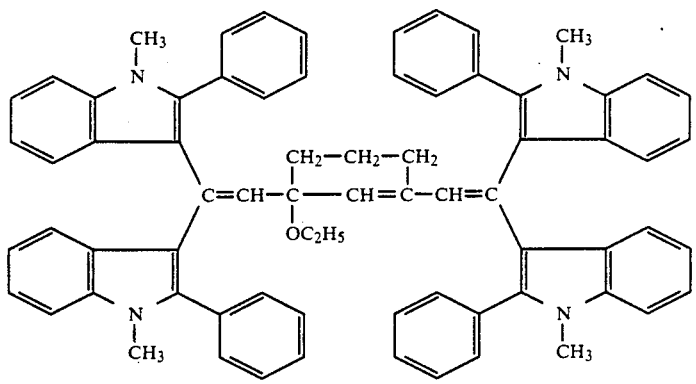
λ$_{max}$ in glacial acetic acid: 796 nm.
The following examples can be prepared analogously:
| Example | R⁵ | R⁶ | Q² | T¹¹ | T¹² | T¹³ | λmax in glacial acetic acid |
|---|---|---|---|---|---|---|---|
| 61 | —CH₃ | phenyl | —CH₃ | H | | —CH₂—C(CH₃)₂—CH₂— | 797 nm |
| 62 | —CH₃ | phenyl | —CH₃ | H | | o-C₆H₄ (benzo) | 794 nm |
| 63 | n-C₄H₉ | 4-Cl-phenyl | —CH₃ | H | | —CH₂—CH₂— | 803 nm |
| 64 | —CH₃ | phenyl | —C₂H₅ | —CH₃ | | o-C₆H₄ (benzo) | 795 nm |
| 65 | —CH₃ | n-C₄H₉ | cyclohexyl | H | | o-C₆H₄ (benzo) | 760 nm |
| 66 | —CH₃ | phenyl | —CH₃ | H | —CH₃ | —CH₃ | 798 nm |

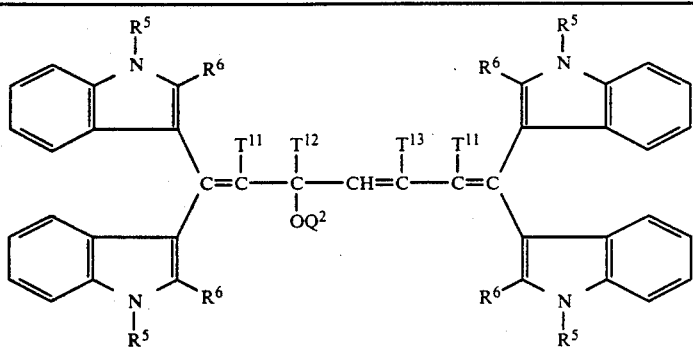

| Example | $R^5$ | $R^6$ | $Q^2$ | $T^{11}$ | $T^{12}$ | $T^{13}$ | $\lambda_{max}$ in glacial acetic acid |
|---|---|---|---|---|---|---|---|
| 67 | —CH₃ | phenyl | —CH₃ | H | H | —CH₃ | 880 nm |

EXAMPLE 68

3.35 g of 1,1,3-tris(1-methyl-2-phenylindol-3-yl) 1,3-butadiene and 2.33 g of 1,1-bis(1-methyl-2-phenylindol-3-yl)-1-propen-3-al are stirred in a mixture of 30 ml of acetic anhydride, 5 ml of glacial acetic acid and 0.5 g of ethanesulphonic acid at 80° to 90° C. for 10 hours. After cooling, the blue solution containing the dyestuff of the formula

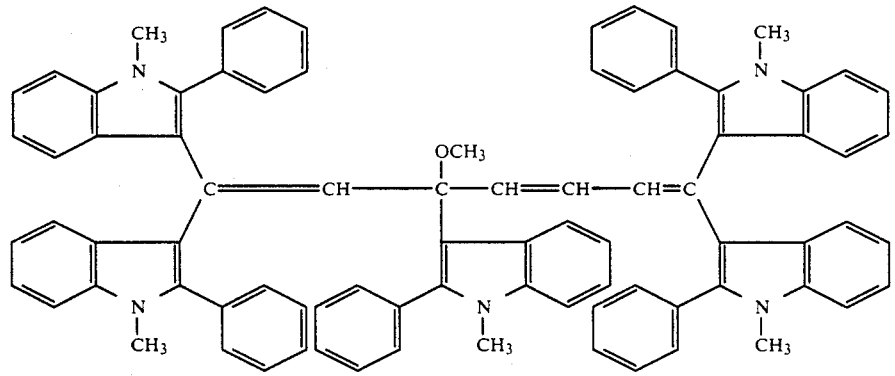

is poured into 150 ml of methanol and made alkaline at 40° to 45° C. with 170 ml of 30% strength methanolic sodium methylate solution. The product is filtered off with suction, washed with methanol and water and dried. This gives 3.3 g (57.3% of theory) of a beige powder of melting point 198° to 200° C. (decomposition). The product in one isomeric form corresponds to the formula

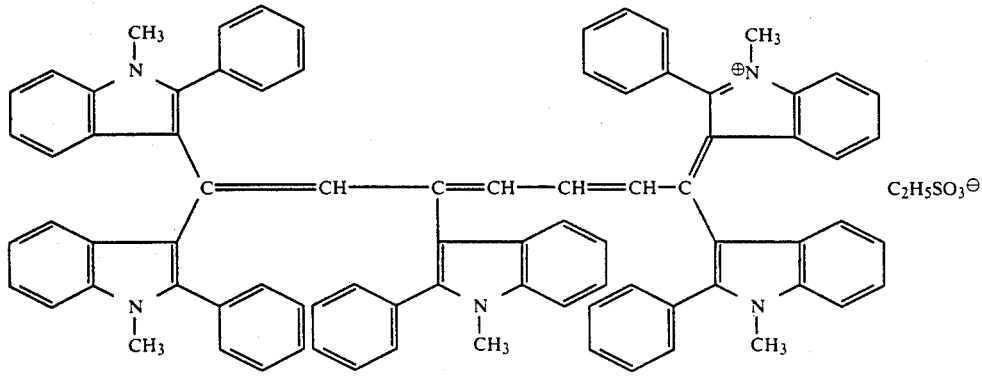

$\lambda_{max}$ in glacial acetic acid: 876 nm.
In contact with acid clay: bluish grey, 750 to 950 nm.

EXAMPLE 69

9.3 g of 1,1-bis(1-methyl-2-phenylindol-3-yl)-1-propen-3-al and 1.0 g of malonic acid are refluxed in 30 ml of phosphorus oxychloride for 90 minutes. After cooling, the mixture is poured into 500 ml of water, stirred for 30 minutes, the product is filtered off with suction and dried: 10.4 g. The resulting dyestuff of the formula is taken up in 100 ml of ethanol and is made alkaline with sodium ethylate solution. This gives 7.4 g (72%) of a brown-beige powder. In one isomeric form it corresponds to the formula:

indol-3-yl)-ethylene and 4.3 g of 1,1,3,3-tetramethoxypropane are reacted as in Example 1. This gives 19.4 g of a brownish beige powder which consists of a mixture (about 3:3:1) of the products of Examples 6 and 25 and the compound of the formula (in one isomeric form)

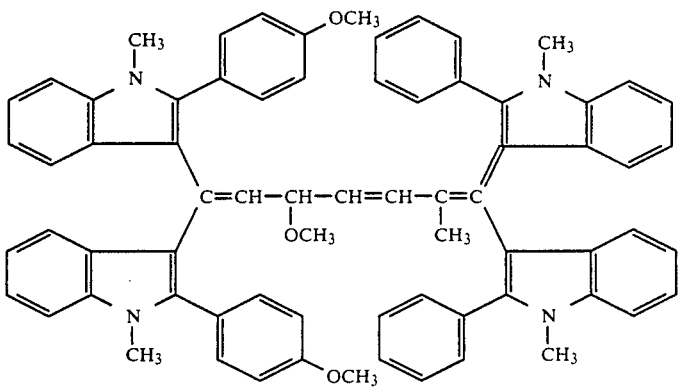

$\lambda_{max}$ in glacial acetic acid: 866 nm. In contact with acid clay: greenish grey, 750 to 950 nm.

EXAMPLE 71

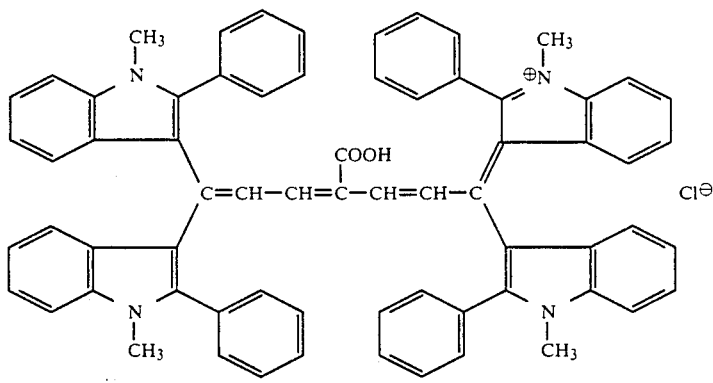

The procedure of Example 1 is repeated, except that the black-blue solution is poured into 200 ml of 1-butanol. Over a period of 1.5 hours, 83.4 g of potassium tert.-butylate are dispersed in the mixture and, towards

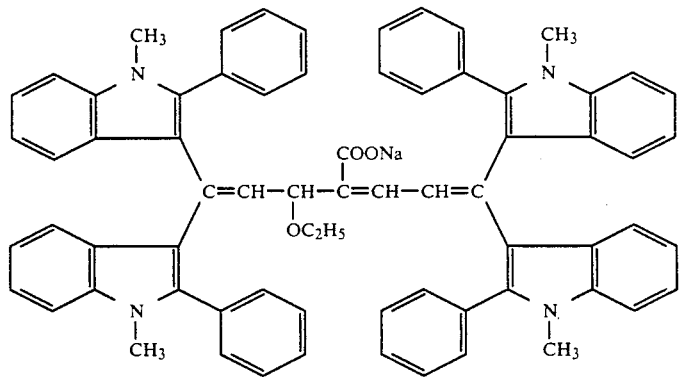

$\lambda_{max}$ in glacial acetic acid: 843 nm.

EXAMPLE 70

11.3 g of 1,1-bis(1-methyl-2-phenylindol-3-yl) propene, 12.5 g of 1,1-bis(1-methyl-2-(4-methoxyphenyl)

the end of the addition, the mixture is refluxed for 2 hours. After cooling, the product is filtered off with suction and washed with 1-butanol and hexane and then with water. The product is dried to give 19.5 g (79.1%) of a beige powder of melting point 213° to 217° C. It contains the ethers of Example 18 and of the formula (in one isomeric form)

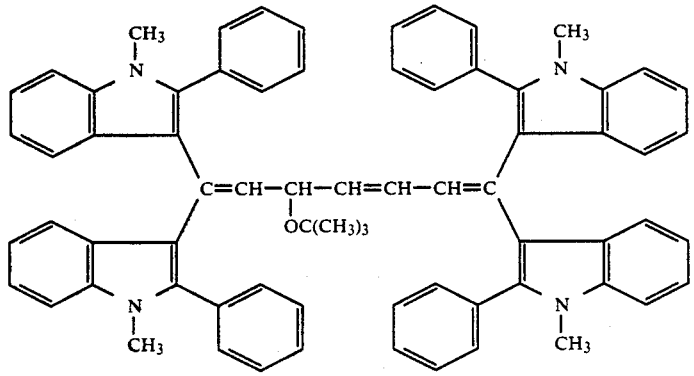

in a ratio of about 85:15.
$\lambda_{max}$ in glacial acetic acid: 860 nm.

EXAMPLE 72

3 g of the tetraindolylheptamethine ether of Example 18 are dissolved in a mixture of 40 g of dodecylbenzene and 60 g of chloroparaffin having a Cl content of 45% (Marlican from Hüls Co.). 223 g of this solution are mixed with 39.5 g of the oxadiazinetrione of Desmodur H (NCO content 20.5%). This mixture is then mixed with 320 g of 0.5% strength polyvinyl alcohol solution and emulsified in the shear gradient of a rotor/stator emulsifier. The crosslinking is carried out using 76 g of 9.0% strength diethylenetriamine solution. The aftertreatment is carried out by heating the dispersion to 60° C. and stirring at 60° C. for 3 hours. This gives a dispersion containing 40% of capsules of the capsule size 7.3 μm.

250 ml of this dispersion are initially introduced and 40 g of fine cellulose powder (Arbocell BE 600/30 from Rettenmeier und Söhne) are slowly added to the dispersion with vigorous stirring. After a minimum of 30 minutes of vigorous stirring, 40 ml of 50% strength SBR latex (Baystal D 1600 from BAYER AG) are added. The resulting 48.5% strength coating composition is diluted with water to a solids content of 30% and applied to the back of a commercially available base paper using an air brush. The add-on after drying is 5 g/m².

The paper thus coated is placed with the coated side on that side of a commercially available carbon-free copying paper which is coated with developer. The pressure applied by writing on the paper coated with capsules gives, on the copying paper, a grey-blue copy which has a strong absorption in the near infrared region from 750 to 950 nm.

The other examples too can be used analogously.

EXAMPLE 73

A solution of 2 g of the tetraindolylheptamethine ether of Example 6 and 3 g of a benzoxazine of the formula

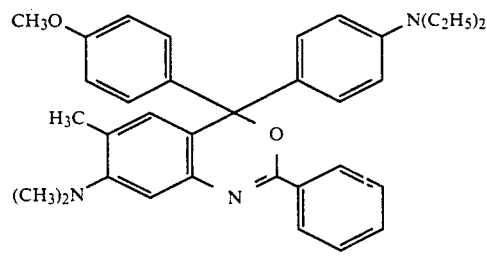

such as has been described in EP 187,329, in 80 g of diisopropylnaphthalene and 17 g of kerosine is microencapsulated in a known manner with gelatin and gum arabic by coazervation, mixed with starch solution and coated onto a sheet of paper. This sheet is placed with the coated side on that side of a commercially available carbon-free copying paper which is coated with developer. The pressure applied by writing on the paper coated with capsules gives, on the copying paper, an intensive black copy which likewise has a strong absorption in the near infrared from 750 to 950 nm.

EXAMPLE 74

In a ball mill, 32 g of 4,4'-isopropylidenediphenol (bisphenol A), 3.8 g of distearylamide of ethylene diamine, 89 g of kaolin, 20 g of a polyvinyl alcohol hydrolysed to 88% and 55 ml of water are ground until the particle size is about 5 μm. In a second ball mill, 6 g of the tetraindolylheptamethine ether of Example 58, 3 g of a polyvinyl alcohol hydrolysed to 88% and 60 ml of water are ground until the particle size is about 3 μm. The two dispersions are combined and coated onto paper giving a dry add-on weight of 5.5 g/m². Bringing the paper into contact with a heated pen develops a greenish grey recording which shows a strong absorption in the near infrared from 750 to 950 nm.

EXAMPLE 75

0.96 g of methanesulphonic acid is added to 9.44 g of the ether of Example 1 in 37 ml of methanol, and the mixture is refluxed for 5 minutes. After cooling, a stable, about 25% strength methanolic solution of the dyestuff of the formula

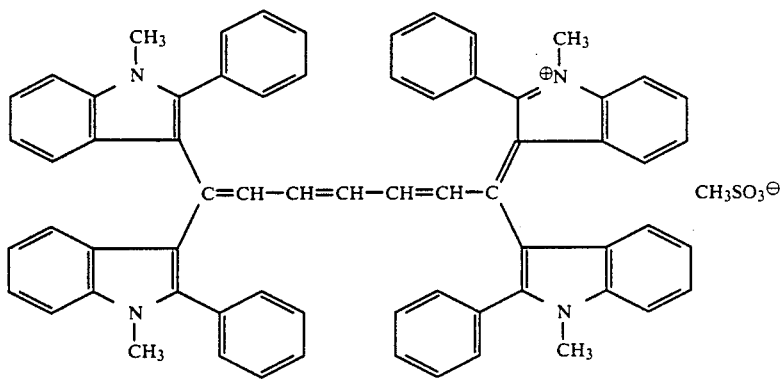

20 is obtained. After adding a binder and adjusting the desired dyestuff concentration, it is suitable for the preparation of optical recording materials. If it is intended to isolate the dyestuff, the methanol must be evaporated in vacuo. In this manner, 10.1 g (100%) of the above dyestuff are obtained as blue flakes of melting point 192° to 195° C.
Solubility in butanol: >333 g/l,
Solubility in methanol: >333 g/l,
$\lambda_{max}$ in glacial acetic acid: 863 nm.

Examples 2 to 71 can be treated exactly analogously, such a highly concentrated methanolic solution not being stable in all cases.

EXAMPLE 76

0.96 g of methanesulphonic acid is added to 12.5 g of the ether of Example 5 in 40 ml of methanol, and the mixture is boiled for 5 minutes. Upon cooling, a fine blue powder precipitates, which is filtered off with suction and dried. This gives 12.1 g (92.4%) of the dyestuff of the formula

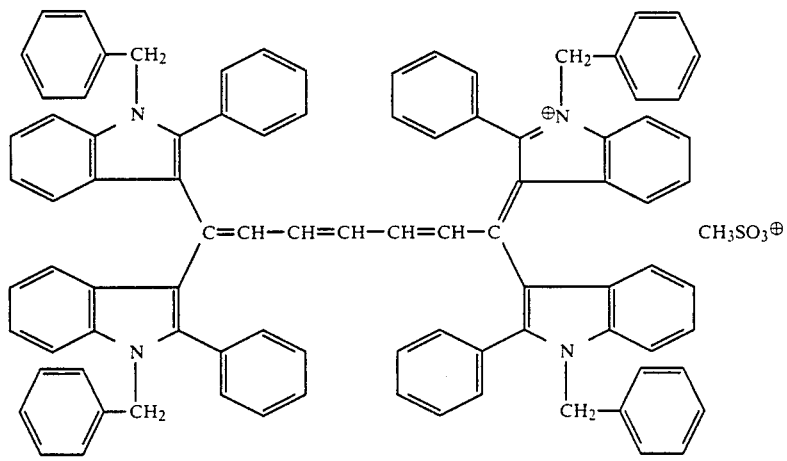

50 of melting point 165° to 168° C.
Solubility in butanol: >200 g/l,
Solubility in methylene chloride: >100 g/l,
$\lambda_{max}$ in glacial acetic acid: 874 nm.

EXAMPLE 77

21.9 g of 1,1-bis(1-methyl-2-phenylindol-3-yl) ethylene, 4.3 g of 1,1,3,3-tetramethoxypropane, 4.94 g of p-toluenesulphonic acid containing water of crystallization, and 50 ml of acetic anhydride are stirred at 80° to 90° C. for 1 to 2 hours. After cooling, the mixture is poured into 200 ml of methanol and stirred for 2 hours. The solvent is completely removed in vacuo. This gives 10.8 g (100%) of blue flakes of the formula

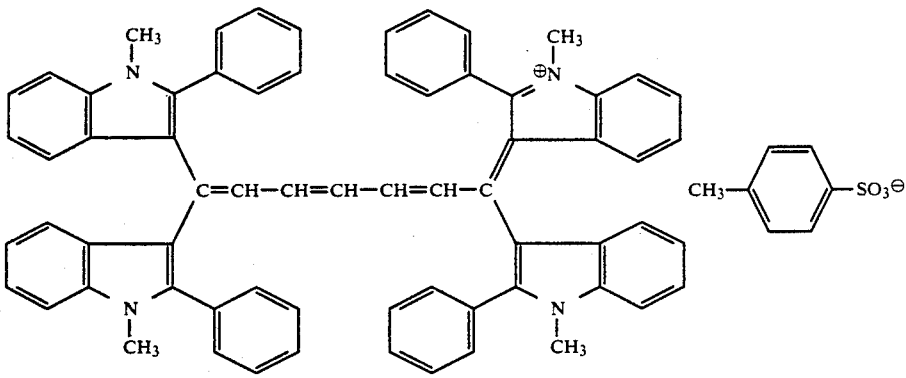

of melting point 170° to 173° C.
Solubility in methanol: >333 g/l,
Solubility in butanol: >333 g/l,
$\lambda_{max}$ is glacial acetic acid: 863 nm.

EXAMPLE 78

26.1 g of 1,1-bis(1-butyl-2-phenylindol-3-yl) ethylene, 4.3 g of 1,1,3,3-tetramethoxypropane and 3.95 g of benzenesulphonic acid are stirred in 37 g of n-butanol at 80° to 90° C. for 7 hours. This gives an approximately 25% strength butanolic solution of the dyestuff of the formula After adding a binder and adjusting the desired dyestuff concentration, it is suitable for the preparation of optical recording materials.

EXAMPLE 79

3.3 g of the ether of Example 47 are boiled together with 342 g of trifluoroacetic acid in 10 g of methanol for 1 hour. This gives an approximately 25% strength methanolic solution of the dyestuff of the formula

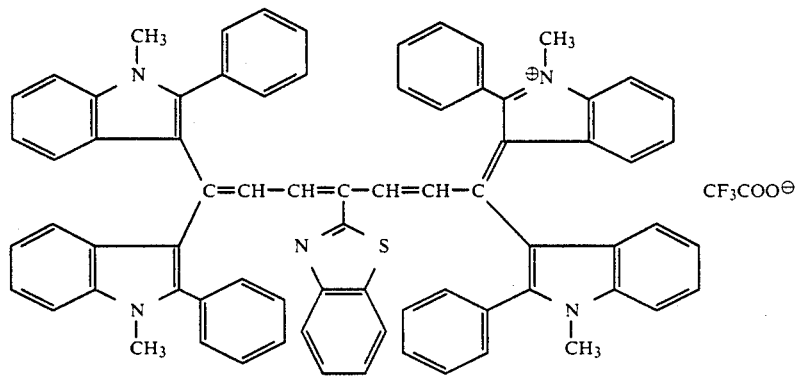

After adding a binder and adjusting the desired dyestuff concentration, it is suitable for the preparation of optical recording materials.

If it is intended to isolate the dyestuff, the methanol must be evaporated in vacuo. This gives 3.48 g (100%) of the above dyestuff as blue flakes of melting point 155° to 159° C.

Solubility in butanol: >333 g/l,
Solubility in methanol: >333 g/l,
$\lambda_{max}$ in glacial acetic acid: 859 nm.

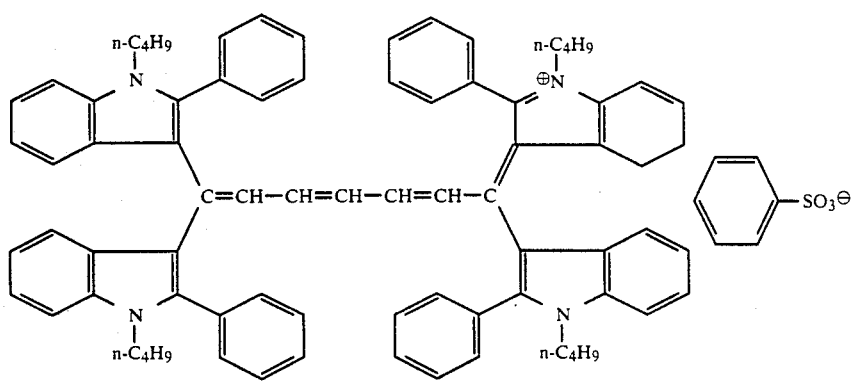

Examples 1 to 46 and 48 to 71 can be treated exactly analogously, such a highly concentrated methanolic solution not being stable in all cases.

EXAMPLE 80

A 5% strength solution of the tetraindolylheptamethine dyestuff of Example 78 in butanol/methanol 2:1, which contains 2.5% of a polymer based on polyvinyl acetate, is applied by the spin coating process to a base sheet made of polymethyl methacrylate, a layer of 0.8 μm being formed. The sheet can be written and read by means of a semiconductor laser.

We claim:

1. Tetraindolylheptamethine dyestuffs of the formula

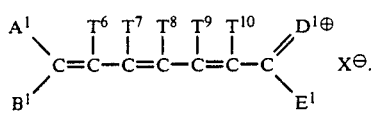

in which $A^1$, $B^1$ and $E^1$ denote

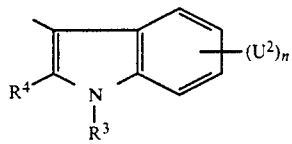

and can be identical to or different from one another, $D^\oplus$ stands for

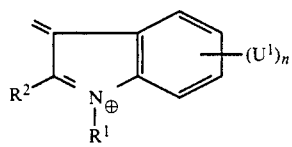

and $X^\ominus$ stands for an anion $Q^1$ denotes hydrogen, $C_1$ to $C_{18}$ alkyl which can be substituted by chlorine, $C_1$ to $C_4$ alkoxy, cyano or $C_1$ to $C_4$ alkoxycarbonyl, or allyl, cyclopentyl, cyclohexyl, or benzyl, phenethyl, naphthylmethyl, phenyl or naphthyl radicals, which are optionally substituted by $C_1$ to $C_4$ alkyl, chlorine and/or $C_1$ to $C_4$ alkoxy, $R^3$ denotes hydrogen, $C_1$ to $C_{18}$ alkyl which can be substituted by chlorine, $C_1$ to $C_4$ alkoxy, cyano or $C_1$ to $C_4$ alkoxycarbonyl, or allyl, cyclopentyl, cyclohexyl, or benzyl, phenethyl, or naphthylmethyl radicals which are optionally substituted by $C_1$ to $C_4$ alkyl, chlorine and/or $C_1$ to $C_4$ alkoxy, $R^4$ denotes hydrogen, $C_1$ to $C_{18}$ alkyl which can be substituted by chlorine, $C_1$ to $C_4$ alkoxy, cyano or $C_1$ to $C_4$ alkoxycarbonyl, or allyl, cyclopentyl, cyclohexyl, or benzyl, phenethyl, naphthylmethyl, phenyl, or naphthyl, radicals which are optionally substituted by $C_1$ to $C_4$ alkyl, chlorine, bromine, $C_1$ to $C_4$ alkoxy, cyano, nitro and/or $C_1$ to $C_4$ alkoxycarbonyl, $T^6$ to $T^{10}$ denote hydrogen, $C_1$ to $C_8$ alkyl which can be substituted by chlorine, $C_1$ to $C_4$ alkoxy, cyano or $C_1$ to $C_4$ alkoxycarbonyl, or vinyl, allyl, cyclopentyl, cyclohexyl, fluorine, chlorine, bromine, $C_1$ to $C_8$ alkoxy which can additionally be substituted by $C_1$ to $C_4$ alkoxy, or $C_1$ to $C_4$ dialkylamino, nitro, cyano, $C_1$ to $C_4$ alkoxycarbonyl, or benzyl, phenethyl, naphthylmethyl, phenyl, or naphthyl, radicals which are optionally substituted by $C_1$ to $C_4$ alkyl, chlorine, $C_1$ to $C_4$ alkoxy, $C_1$ to $C_4$ alkylsulphonyl, cyano and/or $C_1$ to $C_4$ alkoxycarbonyl, $U^2$ denotes hydrogen, $C_1$ to $C_8$ alkyl, allyl, cyclohexyl, benzyl, phenyl, hydroxyl, $C_1$ to $C_4$ alkoxy, chlorine, bromine, $C_1$ to $C_4$ dialkylamino, nitro, cyano, $C_1$ to $C_4$ alkylthio, $C_1$ to $C_4$ alkoxycarbonyl, $C_1$ to $C_4$ dialkylaminocarbonyl, $C_1$ to $C_4$ alkoxycarbonyloxy or $C_1$ to $C_4$ alkylsulphonyl and n denotes 1 or 2.

2. Tetraindolylheptamethine ethers or alcohols of the formula

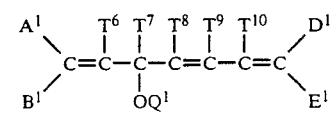

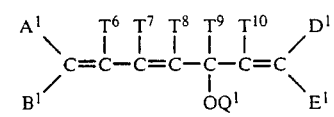

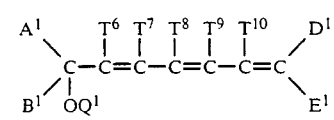

and

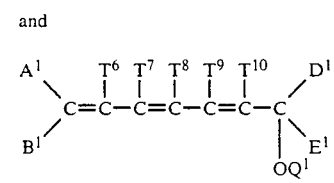

in which $A^1$, $B^1$, $D^1$ and $E^1$ denote

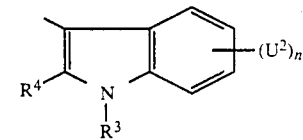

and can be identical to or different from one another, $Q^1$ denotes hydrogen, $C_1$ to $C_{18}$ alkyl which can be substituted by chlorine, $C_1$ to $C_4$ alkoxy, cyano or $C_1$ to $C_4$ alkoxycarbonyl, or allyl, cyclopentyl, cyclohexyl, or benzyl, phenethyl, naphthylmethyl, phenyl or naphthyl radicals, which are optionally substituted by $C_1$ to $C_4$ alkyl, chlorine and/or $C_1$ to $C_4$ alkoxy, $R^3$ denotes hydrogen, $C_1$ to $C_{18}$ alkyl which can be substituted by chlorine, $C_1$ to $C_4$ alkoxy, cyano or $C_1$ to $C_4$ alkoxycarbonyl, or allyl, cyclopentyl, cyclohexyl, or benzyl, phenethyl, or naphthylmethyl radicals which are optionally substituted by $C_1$ to $C_4$ alkyl, chlorine and/or $C_1$ to $C_4$ alkoxy, $R^4$ denotes hydrogen, $C_1$ to $C_{18}$ alkyl which can be substituted by chlorine, $C_1$ to $C_4$ alkoxy, cyano or $C_1$ to $C_4$ alkoxycarbonyl, or allyl, cyclopentyl, cyclohexyl, or benzyl, phenethyl, naphthylmethyl, which are optionally substituted by $C_1$ to $C_4$ alkyl, chlorine, bromine, $C_1$ to $C_4$ alkoxy, cyano, nitro and/or $C_1$ to $C_4$ alkoxycarbonyl, $T^6$ to $T^{10}$ denote hydrogen, $C_1$ to $C_8$ alkyl which can be substituted by chlorine, $C_1$ to $C_4$ alkoxy, cyano or $C_1$ to $C_4$ alkoxycarbonyl, or vinyl, allyl, cyclopentyl, cyclohexyl, fluorine, chlorine, bromine, $C_1$ to $C_8$ alkoxy which can additionally be substituted by $C_1$ to $C_4$ alkoxy, or $C_1$ to $C_4$ dialkylamino, piperidino, pyrrolidino, nitro, cyano, $C_1$ to $C_4$ alkoxycarbonyl, or benzyl, phenethyl, naphthylmethyl, phenyl, or naphthyl, radicals which are optionally substituted by $C_1$ to $C_4$ alkyl, chlorine, $C_1$ to $C_4$ alkoxy, $C_1$ to $C_4$ alkylsulphonyl, cyano and/or $C_1$ to $C_4$ alkoxycarbonyl, $U^2$ denotes hydrogen, $C_1$ to $C_8$ alkyl, allyl, cyclohexyl, benzyl, phenyl, hydroxyl, $C_1$ to $C_4$ alkoxy, chlorine, bromine, $C_1$ to $C_4$ dialkylamino, nitro, cyano, $C_1$ to $C_4$ alkylthio, $C_1$ to $C_4$ alkoxycarbonyl, $C_1$ to $C_4$ dialkylaminocarbonyl, $C_1$ to $C_4$ alkoxycarbonyloxy or $C_1$ to $C_4$ alkylsulphonyl n denotes 1 or 2.

3. Tetraindolylheptamethine ethers or alcohols according to claim 2, in which $Q^1$ denotes hydrogen, $C_1$ to $C_8$ alkyl which can be substituted by chlorine, methoxy, ethoxy or cyano, or allyl, cyclopentyl, cyclohexyl, or benzyl, or phenethyl, radicals which are optionally substituted by methyl, chlorine or methoxy, $R^3$ denotes hydrogen, $C_1$ to $C_8$ alkyl which can be substituted by chlorine, methoxy, ethoxy, cyano or methoxycarbonyl, or allyl, cyclopentyl, cyclohexyl, or benzyl, or phenethyl radicals which are optionally substituted by methyl, chlorine or methoxy, $R^4$ denotes hydrogen, $C_1$ to $C_8$ alkyl which can be substituted by chlorine, methoxy, ethoxy, cyano or methoxycarbonyl, or allyl, cyclopentyl, cyclohexyl, or benzyl, or phenethyl, phenyl, naphthyl, radicals which are optionally substituted by methyl, chlorine, methoxy, cyano, nitro and/or methoxycarbonyl, $T^6$ and $T^{10}$ denote hydrogen, $C_1$ to $C_8$ alkyl which can be substituted by chlorine, methoxy, cyano or methoxycarbonyl, or vinyl, allyl, cyclopentyl, cyclohexyl, chlorine, $C_1$ to $C_8$ alkoxy, cyano, methoxycarbonyl, nitro, benzyl, or phenyl radicals which are optionally substituted by methyl, chlorine, cyano or methoxy, $T^7$ to $T^9$ denote hydrogen, $C_1$ to $C_8$ alkyl which can be substituted by chlorine, methoxy, cyano or methoxycarbonyl, or allyl, cyclopentyl, cyclohexyl, chlorine, bromine, cyano, methoxycarbonyl and ethoxycarbonyl, nitro, $C_1$ to $C_4$ alkoxy, $C_1$ to $C_4$ dialkylamino, benzyl, or phenyl, or naphthyl, radicals which are optionally substituted by methyl, ethyl, chlorine, methoxy, ethoxy, cyano, nitro and/or methoxycarbonyl, or $T^7$ with $T^8$ or $T^9$ or $T^8$ with $T^9$ denote a bridge of the formulae $$-CH_2CH_2-, \quad -CH_2CH_2CH_2-, \quad -CH_2-\underset{\underset{CH_3}{|}}{\overset{\overset{H_3C}{|}}{C}}-CH_2-,$$

$$-CH=CH-CH_2-, \quad -CH=CH-CH=CH- \text{ or}$$

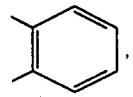

$U^2$ denotes hydrogen, $C_1$ to $C_4$ alkyl, cyclohexyl, benzyl, $C_1$ to $C_4$ alkoxy, chlorine, $C_1$ to $C_4$ dialkylamino, nitro, cyano, methoxycarbonyl or ethoxycarbonyl or methylsulphonyl, it being possible for $U^2$ to be in the 5-, 6- and/or 7-position on the indolyl radical being in the 7-position to form, together with $R^3$, a bridge of the formulae $$-CH_2CH_2- \quad -CH_2CH-, \quad -CH-CH-,$$
$$\qquad\qquad\qquad\quad \overset{|}{CH_3} \qquad \overset{|}{CH_3}\ \overset{|}{CH_3}$$

$$-\underset{H_3C}{\overset{}{C}}-CH-, \quad -CH_2CH_2CH_2-, \quad -CH_2CH_2CH-,$$
$$\quad\ \ CH_3\ CH_3 \qquad\qquad\qquad\qquad\qquad\quad CH_3$$

$$-\underset{H_3C}{\overset{}{C}}-CH_2-CH-$$
$$\quad\ \ CH_3\ CH_3$$

and
n denotes 1 or 2.

4. Tetraindolylheptamethine ethers or alcohols according to claim 2 of the following formula

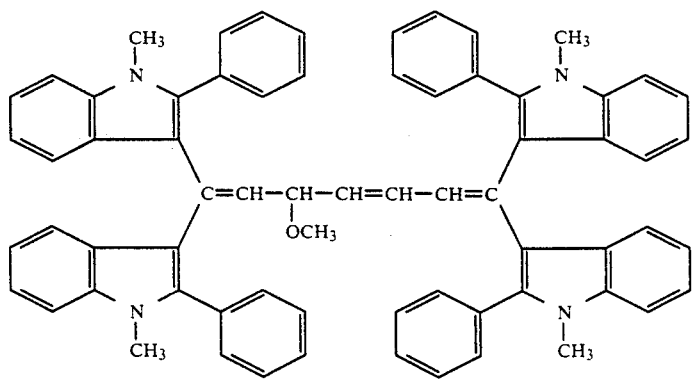

5. Tetraindolylheptamethine ethers or alcohols according to claim 2 of the following formula

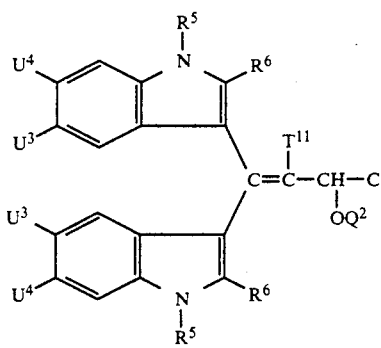
in which
R⁵ is CH₃,
R⁶ is
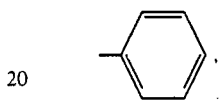
Q² is CH₃,
U³ and U⁴ are H and
T¹¹ is CH₃.
* * * * *

UNITED STATES PATENT AND TRADEMARK OFFICE
CERTIFICATE OF CORRECTION

PATENT NO. : 5,017,707

DATED : May 21, 1991

INVENTOR(S) : Berneth et al.

It is certified that error appears in the above-identified patent and that said Letters Patent is hereby corrected as shown below:

| | |
|---|---|
| Col. 49, line 12 | After " naphthyl " delete " , " |
| Col. 49, line 21 | After " alkylsulphonyl " insert -- , and -- |
| Col. 49, line 28 | After " phenethyl " delete " , " |
| Col. 50, line 8 | After " napthyl " delete " , " |
| Col. 50, lines 12-24 | Delete " $T^7$ with $T^8$ or $T^9$ or $T^8$ with $T^9$ denote a bridge of the formulae |

$-CH_2CH_2-$, $-CH_2CH_2CH_2-$, $-CH=CH-CH-$, $-CH=CH-CH=CH-$ or

 , "

| | |
|---|---|
| Col. 50, lines 30-43 | Delete " being in the 7-position to form together with $R^3$, a bridge of the formulae |

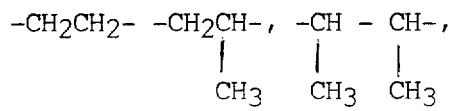

UNITED STATES PATENT AND TRADEMARK OFFICE
CERTIFICATE OF CORRECTION

PATENT NO. : 5,017,707

DATED : May 21, 1991

INVENTOR(S) : Berneth et al.

It is certified that error appears in the above-identified patent and that said Letters Patent is hereby corrected as shown below:

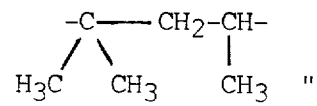
"

Signed and Sealed this

Sixth Day of April, 1993

*Attest:*

STEPHEN G. KUNIN

*Attesting Officer*     *Acting Commissioner of Patents and Trademarks*